(12) United States Patent
Yang et al.

(10) Patent No.: US 11,697,885 B2
(45) Date of Patent: Jul. 11, 2023

(54) PRODUCTION OF NANOPOROUS FILMS

(71) Applicant: UNIVERSITY OF CENTRAL FLORIDA RESEARCH FOUNDATION, INC., Orlando, FL (US)

(72) Inventors: Yang Yang, Winter Park, FL (US); Kyle Marcus, Orlando, FL (US); Kun Liang, Sichuan (CN)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 5 days.

(21) Appl. No.: 16/334,558

(22) PCT Filed: Sep. 19, 2017

(86) PCT No.: PCT/US2017/052243
§ 371 (c)(1),
(2) Date: Mar. 19, 2019

(87) PCT Pub. No.: WO2018/053499
PCT Pub. Date: Mar. 22, 2018

(65) Prior Publication Data
US 2020/0208287 A1    Jul. 2, 2020

Related U.S. Application Data

(60) Provisional application No. 62/396,759, filed on Sep. 19, 2016.

(51) Int. Cl.
*C25D 3/56* (2006.01)
*C25D 3/12* (2006.01)
(Continued)

(52) U.S. Cl.
CPC ............... *C25D 3/562* (2013.01); *C25D 1/04* (2013.01); *C25D 3/12* (2013.01); *C25D 3/18* (2013.01);
(Continued)

(58) Field of Classification Search
None
See application file for complete search history.

(56) References Cited

U.S. PATENT DOCUMENTS 3,183,067 A * 5/1965 Du Rose ................ C25D 5/627
428/656
3,218,244 A * 11/1965 Passal .................. C07D 213/20
546/180

(Continued)

FOREIGN PATENT DOCUMENTS

JP    2003120390 A    4/2003
JP    2007016280       1/2007

OTHER PUBLICATIONS

Yang, Y., Fei, H., Ruan, G. and Tour, J.M. (2015), Porous Cobalt-Based Thin Film as a Bifunctional Catalyst for Hydrogen Generation and Oxygen Generation. Adv. Mater., 27: 3175-3180. https://doi.org/10.1002/adma.201500894 (Year: 2015).*

(Continued)

*Primary Examiner* — Louis J Rufo
(74) *Attorney, Agent, or Firm* — Timothy H. Van Dyke; Wolter, Van Dyke, Davis, PLLC

(57) ABSTRACT

A process is provided comprising submerging a substrate in an electrochemical deposit bath having at least a metal salt and saccharin. In embodiments, the film is further treated with anodization, and in other cases chemical vapor deposition. Films are also provided formed by the disclosed processes. The films are nanoporous on at least a portion of a surface of the films. Also disclosed are electronic devices having the films disclosed, including lithium-ion batteries, (Continued)

storage devices, supercapacitors, electrodes, semiconductors, fuel cells, and/or combinations thereof.

10 Claims, 31 Drawing Sheets

(51) Int. Cl.
| | |
|---|---|
| C25D 3/20 | (2006.01) |
| C25D 11/34 | (2006.01) |
| C25D 1/04 | (2006.01) |
| C25D 3/18 | (2006.01) |
| H01G 11/26 | (2013.01) |
| H01G 11/30 | (2013.01) |
| H01G 11/86 | (2013.01) |
| H01M 4/04 | (2006.01) |
| H01M 4/36 | (2006.01) |
| H01M 4/58 | (2010.01) |
| H01M 10/0525 | (2010.01) |
| H01M 4/02 | (2006.01) |

(52) U.S. Cl.
CPC .............. *C25D 3/20* (2013.01); *C25D 11/34* (2013.01); *H01G 11/26* (2013.01); *H01G 11/30* (2013.01); *H01G 11/86* (2013.01); *H01M 4/0452* (2013.01); *H01M 4/364* (2013.01); *H01M 4/5815* (2013.01); *H01M 10/0525* (2013.01); *H01M 2004/021* (2013.01)

(56) References Cited

U.S. PATENT DOCUMENTS

| | | | | |
|---|---|---|---|---|
| 3,360,397 | A | | 12/1967 | Koretzky |
| 3,767,537 | A | * | 10/1973 | Selker ...................... C25D 1/04 |
| | | | | 204/216 |
| 3,844,906 | A | * | 10/1974 | Bailey .................... C25D 5/611 |
| | | | | 204/239 |
| 3,876,513 | A | * | 4/1975 | Brown ...................... C25D 3/18 |
| | | | | 205/269 |
| 4,756,816 | A | * | 7/1988 | Liao ........................ C25D 3/562 |
| | | | | 205/260 |
| 4,882,232 | A | * | 11/1989 | Bugnet ................. C23C 18/206 |
| | | | | 428/613 |
| 7,998,539 | B2 | | 8/2011 | Chang et al. |
| 8,974,889 | B2 | | 3/2015 | Bulliard et al. |
| 2006/0216603 | A1 | | 9/2006 | Choi |
| 2008/0197021 | A1 | | 8/2008 | Liu et al. |
| 2012/0049102 | A1 | | 3/2012 | Nobe et al. |
| 2013/0236720 | A1 | | 9/2013 | Heiman et al. |

OTHER PUBLICATIONS

Yang et al CS Nano 2014, 8, 9, 9622-9628, Sep. 8, 2014, https://doi.org/10.1021/nn504019 (Year: 2015).*
Cloud, Andrew N. et al., "Low-temperature CVD of iron, cobalt, and nickel nitride thin films from bis[di(tertbutyl)amido]metal(II) precursors and ammonia", J. Vac. Sci. Technol. A, Mar./Apr. 2014, vol. 32(2), pp. 020606-1-020606-7.
Higgins, Thomas M. et al., "A Commercial Conducting Polymer as Both Binder and Conductive Additive for Silicon Nanoparticle-Based Lithium-Ion Battery Negative Electrodes", ACS Nano, 2016, vol. 10, pp. 3702-3713.
Louie, Mary W. et al., "An Investigation of Thin-Film Ni—Fe Oxide Catalysts for the Electrochemical Evolution of Oxygen", J. Am. Chem. Soc., 2013, vol. 135, pp. 12329-12337.
Mazzi, A. "Physicalvapordepositionofmixed-metaloxidesbasedonFe,Coand Ni aswateroxidationcatalysts", Materials Science in Semiconductor Processing, 2016, vol. 42, pp. 155-158.
Wang, Lu et al., "Fe/Ni Metal-Organic Frameworks and Their Binder-Free Thin Films for Efficient Oxygen Evolution with Low Overpotential", ACS Appl. Mater. Interfaces, 2016, vol. 8, pp. 16736-16743.
Xiong, Qin-qin et al., "Three-dimensional porous nano-Ni/Fe3O4 composite film: enhanced electrochemical performance for lithium-ion batteries", J. Mater. Chem., 2012, vol. 22, pp. 18639-18645.
Yang, Y et al., "Efficient Electrocatalytic Oxygen Evolution on Amorphous Nickel-Cobalt Binary Oxide Nanoporous Layers—Supporting Information", 10 pages.
PCT/US2017/052243; International Search Report and Written Opinion, dated Jan. 24, 2018, 16 pages.

* cited by examiner

FIG. 12a
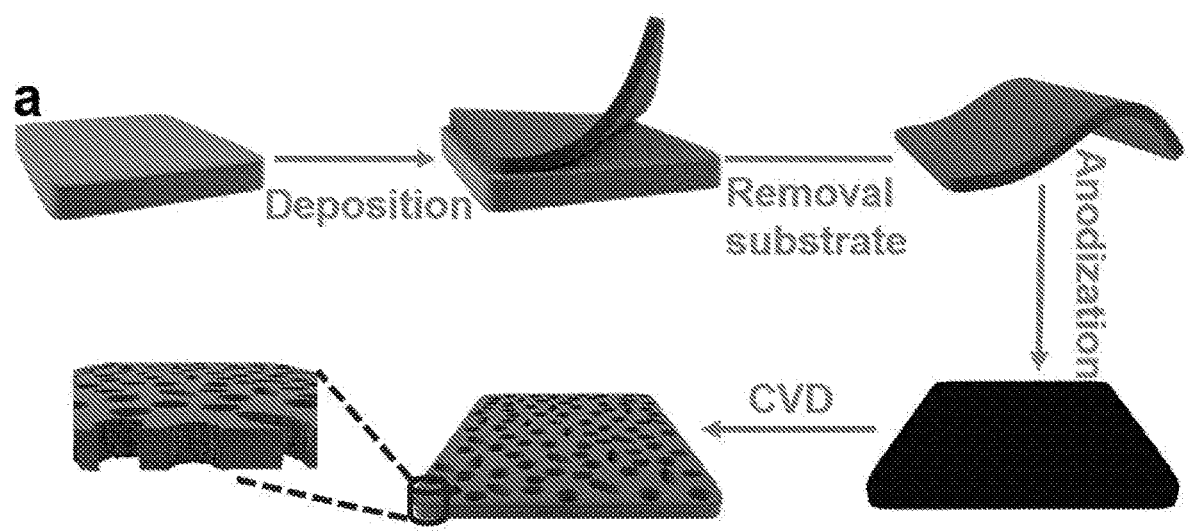
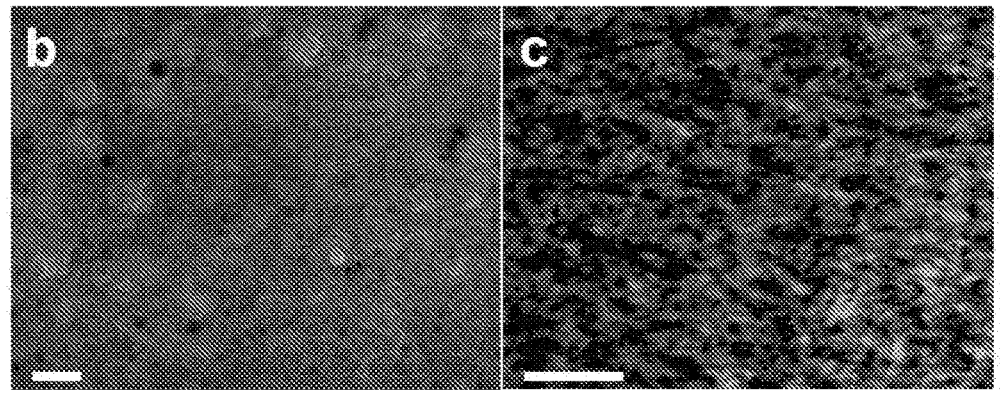
FIG. 12b  FIG. 12c

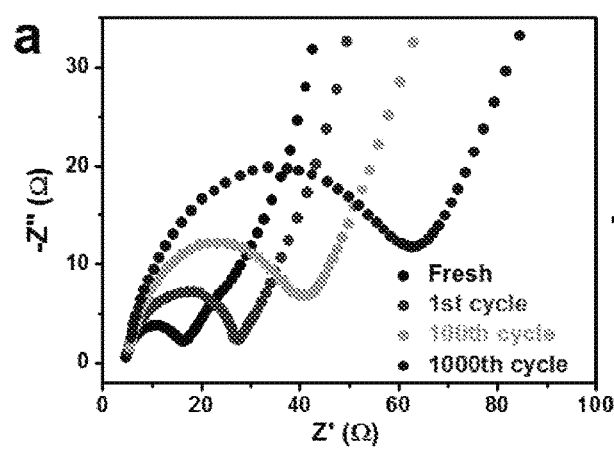 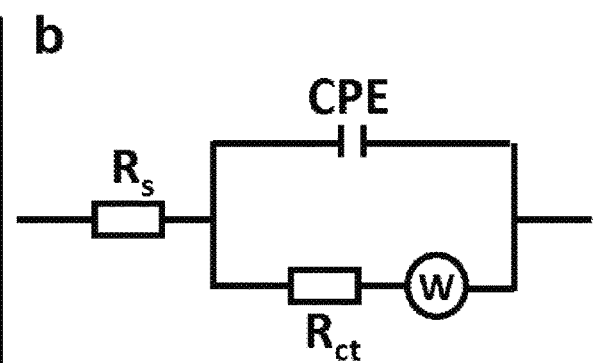
FIG. 23a            FIG. 23b

PRODUCTION OF NANOPOROUS FILMS

TECHNICAL FIELD

Embodiments of the present invention relate to freestanding thin film development through electrodeposition of iron, cobalt, nickel and their alloying combinations. Unique nanoporous structures can be observed after deposition and are further enhanced by anodically treating the thin film deposit layers. Applications for this type of material may include electrodes in catalysis, supercapacitor, lithium battery, fuel cell, hydrogen storage, $CO_2$ storage, separation and sensing, seawater desalination, writing heads, compact disk and shielding-foil.

BACKGROUND

High-performance energy storage and conversion devices are in urgent demand to meet the challenges of the fast development of renewable energy production and conversion. Supercapacitors, lithium batteries, fuel cells, have been widely used as the primary electrical energy storage devices in various electronics. In addition, energy conversion materials that use catalysis for production of hydrogen are a promising alternative to fossil fuels, and are one of the most attractive materials for sustainable energy production.

Currently, implementation of energy conversion and storage materials for supercapacitors, batteries, catalysis, fuel cells, hydrogen storage, $CO_2$ storage, separation and sensing, seawater desalination, writing heads, compact disk and shielding-foil are composed of powders and particles that require organic binders and current collectors for electrode assembly. Organic binders are undesirable because they increase electrode resistance and complicate material recycling. Freestanding nanoporous thin film electrodes do not require organic binders or current collectors, therefore, they can replace traditional energy conversion and storage materials.

SUMMARY

The general embodiments for the present invention encompass the preparation of freestanding nanoporous thin films (NPF) and nanoporous thin film layers on a substrate (the "deposit" or "deposit layer") by electrochemical deposition, as well as NPF formed from treating the deposit or freestanding NPF formed from the electrochemical deposition with anodic treatments, resulting in NPFs to be used as electrodes for catalysis, supercapacitors, and lithium batteries. The inventors recognize that physical deposition, such as sputtering, evaporation, and epitaxy techniques, can be used to grow thin films, but controlling the nanostructure can be difficult. Additionally, with physical deposition methods it is unlikely that the substrate can be removed, which limits its applications.

It has been discovered that an electrodeposition process employing saccharin results in a deposit layer that is more easily removed from the substrate. Therefore, as a reasonable alternative, electrochemical deposition methods employing baths containing saccharin are disclosed, resulting in the deposition of a deposit layer that is easily removed from a conductive substrate, resulting in freestanding and tunable material. Furthermore, it was also discovered that the use of saccharin in the electrochemical deposition process resulted in a nanoporosity of the deposit layer. When the deposit layer is removed from the substrate, a freestanding thin film results which is also nanoporous. This nanoporosity of the deposit layer and resulting NPF formed from the electrochemical deposit method which employed saccharin was not previously achieved by prior electrochemical deposition methods. Therefore, an NPF is also disclosed which has been prepared by electrochemical deposition using a saccharin bath. A variety of conductive substrates, and freestanding deposits may be obtained after electrodeposition. The conductive substrates are also recyclable.

Transition metals (Fe, Co, Ni), their alloys and/or oxides are low-cost, earth-abundant resources that are gaining attention for being efficient electrode materials for energy storage and conversion applications. Electrodeposition of freestanding thin film layers being comprised of transition metals (Fe, Co, Ni), their alloys and/or oxides using this technique results in a deposit layer that contains nanoporous structure can be tuned through anodization, incorporating nanoporous structures into the film layers to improve energy conversion and storage performance. In an embodiment, freestanding Ni, Co, NiFe, NiCo, FeCo, NiFeCo metals and their oxides layers are prepared by the as described fabrication techniques for implementation as electrode materials.

According to embodiments, electrochemical deposition baths and operating parameters are provided to produce the freestanding layers (the deposit). In one example, the electrochemical deposition bath composition comprises at least of a metal salt and saccharin. In another embodiment, the electrochemical deposition bath composition comprises $Ni^{2+}$ ion concentration of approximately 0 to 350 grams per liter, $Fe^{2+}$ ion concentration of approximately 0 to 100 grams per liter, and $Co^{2+}$ ion in concentration of approximately 0 to 250 grams per liter. The baths also include boric acid or like chemicals with a concentration of approximately 0 to 60 grams per liter, NaCl or like chemicals with a concentration of approximately 0 to 50 grams per liter, sodium citrate or like chemicals with a concentration of approximately 0 to 30 grams per liter, and saccharin or like chemicals with a concentration of approximately 0 to 5 grams per liter. The baths compositions can be different depending on the different layers, as well as the performances by changing the deposit compositions. The pH values range from 1 to 6 with temperature ranging between 10° C. and 65° C. The current density for electrochemical deposition is about 0.001-1000 mA $cm^{-2}$.

After deposition is complete, the deposit layer is removed from the electrolyte bath and washed with DI water, then ethanol and air dried. Removing the deposit layer from the substrate may be done in many ways. One way first requires the material edges to be physically cut (deposit layer typically sticks very well to the edges). After cutting, the material may be removed by holding the material in one corner and physically striking the material in the opposite corner. Tweezers may then be used to fully remove the deposit from the substrate, leaving a freestanding NPF.

Anodic electrolytes and parameters are provided to further prepare the freestanding NPF (formed using the deposit process disclosed). The anodization process may be performed on the deposit to prepare NPF with oxide nanoporous layers at a constant current of 0.1-1000 mA $cm^{-2}$ or a constant potential of 5-300 V. The anodization electrolyte includes $F^-$ with a concentration of approximately 0.01 to 11 grams per liter, deionized water with a concentration of approximately 0 to 54 grams per liter in ethylene glycol, glycerol, dimethyl sulphoxide, N,N-dimethylformamide, isopropyl alcohol.

Also provided are embodiments of NPFs prepared for use with and associated with electronic devices. Specific embodiments using NPFs associated with lithium batteries are disclosed, as well as for use as a supercapacitor.

BRIEF DESCRIPTION OF THE DRAWINGS

FIG. 12$a$ shows a process for creating a NPF which may be associated with a lithium ion battery, in accordance with an embodiment.

FIG. 12$b$-$c$ is a top-view SEM and TEM images of a NPF after sulfuration, respectively, in accordance with an embodiment.

FIG. 14$b$ is a cross-sectional STEM image of energy-dispersive X-ray spectrum (EDS) elemental mappings of Ni, Fe and S, respectively, in accordance with an embodiment.

FIGS. 17$b$-$d$ are XPS profiles of Ni $2p_{3/2}$ peak, Fe $2p_{3/2}$ peak and S $2p$ peak, respectively, in accordance with an embodiment.

FIG. 19$b$ reflects charge-discharge profiles with different current densities, in accordance with an embodiment.

FIG. 19$c$ are rate performance of the NPF electrode in units of current density in mA cm$^{-3}$, in accordance with an embodiment.

FIG. 19$d$ is a line graph showing the long-term cyclability at a current density of 50 mA cm$^3$, in accordance with an embodiment.

FIG. 22$b$ is a corresponding peak current vs square root of scan rates, in accordance with an embodiment.

FIG. 23$a$ is a graph showing electrochemical impedance spectroscopy (EIS) profiles before and after 1, 100, and 1000 cycles, in accordance with an embodiment.

FIG. 23$b$ shows the corresponding equivalent circuit of FIG. 23$a$, in accordance with an embodiment.

FIG. 24$b$ shows galvanostatic charge/discharge (GCD) curves at different current densities, in accordance with an embodiment.

FIG. 24$c$ is a graph showing the variation of specific capacitance with different current density, in accordance with an embodiment.

FIG. 24$d$ is an electrochemical impedance spectroscopy EIS of the device with inset of enlarged high-frequency region, in accordance with an embodiment.

FIG. 24$e$ are CV curves with different binding angles at 50 mV s$^{-1}$, in accordance with an embodiment.

FIG. 24$f$ shows the cycling performance at 10 A g$^{-1}$, in accordance with an embodiment.

FIG. 29$c$-$d$ shows Young's modulus and ultimate tensile strength (UTS) and strain at fracture, respectively, obtained from the stress-strain curves, in accordance with an embodiment.

DETAILED DESCRIPTION

A film is disclosed having a highly porous nanostructure. Also disclosed is a deposition process. According to an embodiment, methods are disclosed for preparing a deposit by electrochemical deposition which may be removed to form a freestanding layer which is a nanoporous film (referred to herein as a "film" or a "NPF"), as well as methods for further treating the NPF. A nanostructure is also disclosed. The films described herein may be utilized in several applications, for instance an electrode, supercapacitor, or associated with an electronic device such as a Li-ion battery, as well as other applications.

As used herein, the terms "film," and "thin film" refer to any film disclosed having the structure and properties disclosed, as these films are typically thin. These terms also refer to the film deposited by the electrochemical deposition processes disclosed—typically when it has been removed from the substrate. "Deposit" refers to the film when it is deposited onto and still adhered to a substrate. The term "freestanding layer" refers to the film not adhered to any substrate, but prior to any post-deposition treatment (such as anodization). However, it is understood that freestanding layers which are later treated any anodization may also be freestanding layers themselves. A "layer" which is not freestanding is considered a layer on top of a substrate, unseparated. Nanoporous film (NPF) refers to a film which has a nanoporous structure on at least a portion of the film. A NPF may be the film produced by the deposit process without further treatment, the film generated when the deposit layer is removed from the substrate, which has a nanoporous structure on at least a portion of the film, or it may refer to a film produced by further treating the deposit layer or freestanding deposit layer by anodization.

Embodiments of films produced by the deposition methods disclosed may comprise Ni, Co, NiFe, NiCo, FeCo, NiFeCo or a combination thereof. Recognizing the films may necessarily include trace impurities, the films described are intended to be at least 90% of these metals or combination thereof. Films anodized In an embodiment, the deposition process disclosed takes place using a unique bath. For example, electrodeposition bath compositions may use at least a metal salt and saccharin. Saccharin is defined as either the chemical of the below structure or a salt thereof:

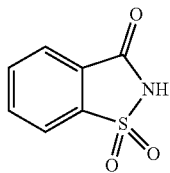 [SMILES: O=C1NS(=O)(=O)c2ccccc21]

Figure 3:
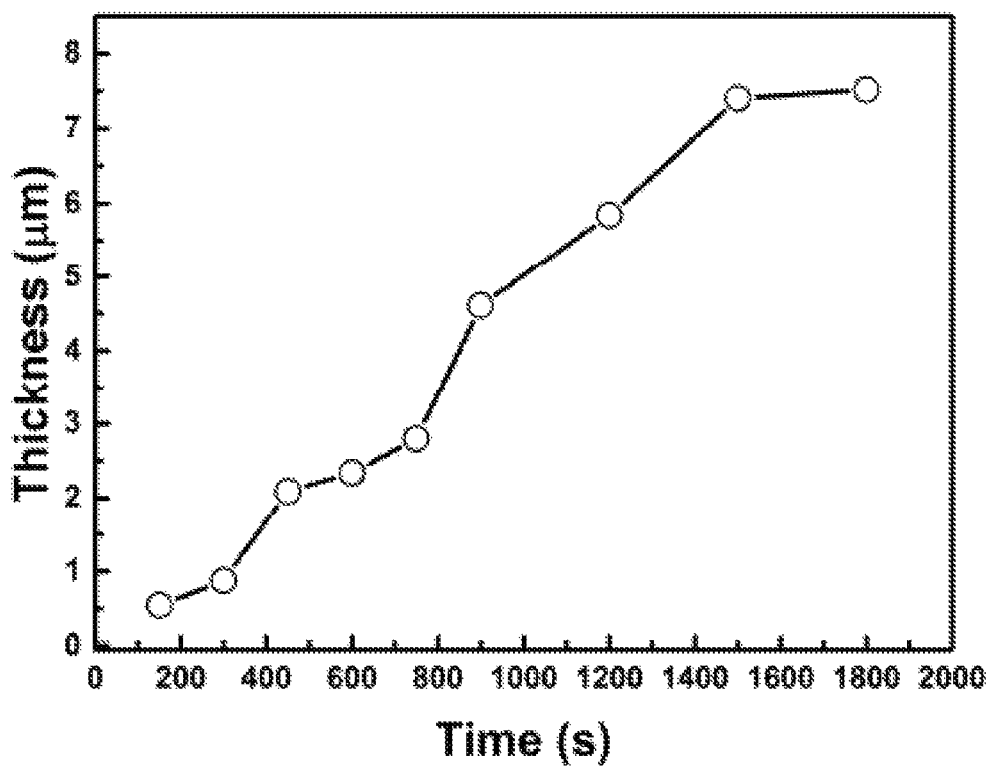
FIG. 3 is an image showing the variation of thickness for NiFe thin film after electrodeposition for various times, in accordance with an embodiment.

In an embodiment, the metal salts may be nickel salts, iron salt, cobalt salts and other chemicals for fabrication of nanoporous and freestanding layers. The anodic electrolytes may use $F^-$ and deionized water to further prepare freestanding layers. The time that the substrate remains in the bath depends on the thickness desired to be achieved; the time and thickness parameters are given in FIG. 3. FIG. 3 displays the variation of thickness for NiFe thin film after electrodeposition. From the curve, it can be found that the thickness did not increase linearly with the electrodeposition time. A sudden increase was observed after 800 s.

Example 1

A bath composition and anodic electrolyte for Ni layer and NiO layer are set forth in Table 1 and 2, respectively.

TABLE 1

Example of a bath composition for the production of a Ni thin film

| Composition | Weight/g $L^{-1}$ | Range/g $L^{-1}$ |
|---|---|---|
| $NiSO_4 \cdot 7H_2O$ | 250 | 0-350 |
| $NiCl_2 \cdot 6H_2O$ | 45 | 0-90 |
| $H_3BO_3$ | 40 | 0-45 |
| Saccharin | 0.5 | 0-2 |

The pH is about 4.0 and the temperature is 25° C. The current density is about 10 mA $cm^{-2}$.

TABLE 2

Example of a preferred anodization electrolyte for NiO thin film

| Composition | Weight/g $L^{-1}$ | Range/g $L^{-1}$ |
|---|---|---|
| $NH_4F$ | 7.4 | 0-11 |
| Water | 36 | 0-54 |

The constant current density is 20 mA $cm^{-2}$ at room temperature.

Example 2

Example of basic bath composition and anodic electrolyte for NiFe layer and NiFe oxide layer were set in Table 3 and 4, respectively.

TABLE 3

Example of a preferred basic bath composition for NiFe thin film.

| Composition | Weight/g $L^{-1}$ | Range/g $L^{-1}$ |
|---|---|---|
| $NiSO_4 \cdot 7H_2O$ | 100 | 0-230 |
| $NiCl_2 \cdot 6H_2O$ | 15 | 0-90 |
| $FeSO_4 \cdot 7H_2O$ | 15 | 0-40 |
| $H_3BO_3$ | 45 | 0-50 |
| Sodium Citrate | 15 | 0-30 |
| Saccharin | 0.5 | 0-5 |

The pH is about 3.6 and the temperature is 25° C. The current density is about 25 mA $cm^{-2}$.

TABLE 4

Example of a preferred anodization electrolyte for NiFe oxide thin film.

| Composition | Weight/g $L^{-1}$ | Range/g $L^{-1}$ |
|---|---|---|
| $NH_4F$ | 7.4 | 0-11 |
| Water | 36 | 0-54 |

The constant potential is 20 V at room temperature.

In this embodiment, the $Fe^{2+}$ may be presented in the bath in an amount of at most 20% by weight based on the total weight of discharge ion salts. The $Fe^{2+}$ is presented in the bath in an amount of at most 35% by weight based on the total weight of discharge ion salts in embodiments. In other embodiments, the $Fe^{2+}$ is presented in the bath in an amount of at most 25% by weight based on the total weight of discharge ion salts. The Fe source is $FeSO_4$, $FeCl_2$, $Fe(NO_3)_2$ and other inorganic chemicals.

Example 3

Examples of basic bath composition and anodic electrolyte for NiCo layer and NiCo oxide layer were set in Table 5 and 6, respectively.

TABLE 5

Example of a preferred basic bath composition for NiCo thin film.

| Composition | Weight/g L$^{-1}$ | Range/g L$^{-1}$ |
|---|---|---|
| NiSO$_4$•7H$_2$O | 200 | 0-220 |
| NiCl$_2$•6H$_2$O | 15 | 0-60 |
| CoSO$_4$•6H$_2$O | 6 | 0-155 |
| CoCl$_2$•6H$_2$O | 14 | 0-40 |
| H$_3$BO$_3$ | 30 | 0-40 |
| NaCl | 5 | 0-13 |

The pH is about 4.0 and the temperature is 25° C. The current density is about 15 mA cm$^{-2}$.

TABLE 6

Example of a preferred anodization electrolyte for NiCo oxide thin film.

| Composition | Weight/g L$^{-1}$ | Range/g L$^{-1}$ |
|---|---|---|
| NH$_4$F | 7.2 | 0-11 |
| Water | 36 | 0-54 |

The constant current is 20 mA cm$^{-2}$ at room temperature.

Example 4

Examples of basic bath composition and anodic electrolyte for FeCo layer and FeCo oxide layer were set in Table 7 and 8, respectively.

TABLE 7

Example of a preferred basic bath composition for FeCo thin film.

| Composition | Weight/g L$^{-1}$ | Range/g L$^{-1}$ |
|---|---|---|
| CoSO$_4$•6H$_2$O | 50 | 0-150 |
| CoCl$_2$•6H$_2$O | 3 | 0-50 |
| FeSO$_4$•7H$_2$O | 6 | 0-100 |
| H$_3$BO$_3$ | 30 | 0-60 |
| NaCl | 30 | 0-50 |
| Saccharin | 4 | 0-5 |

The pH is about 3.0 and the temperature is 30° C. The current density is about 50 mA cm$^{-2}$.

TABLE 8

Example of a preferred anodization electrolyte for FeCo oxide thin film.

| Composition | Weight/g L$^{-1}$ | Range/g L$^{-1}$ |
|---|---|---|
| NH$_4$F | 3.6 | 0-11 |
| Water | 18 | 0-54 |

The constant potential is 40 V at room temperature.

Example 5

Examples of basic bath composition and anodic electrolyte for FeCo layer and FeCo oxide layer were set in Table 9 and 10, respectively.

TABLE 9

Example of a preferred basic bath composition for NiFeCo thin film.

| Composition | Weight/g L$^{-1}$ | Range/g L$^{-1}$ |
|---|---|---|
| NiSO$_4$•7H$_2$O | 150 | 0-200 |
| CoCl$_2$•6H$_2$O | 15 | 0-200 |
| FeSO$_4$•7H$_2$O | 25 | 0-100 |
| H$_3$BO$_3$ | 45 | 0-60 |
| Sodium Citrate | 25 | 0-50 |
| Saccharin | 0.75 | 0-5 |

The pH is about 5.6 and the temperature is 45° C. The current density is about 10 mA cm$^{-2}$.

TABLE 10

Example of a preferred anodization electrolyte for NiFeCo oxide thin film.

| Composition | Weight/g L$^{-1}$ | Range/g L$^{-1}$ |
|---|---|---|
| NH$_4$F | 7.4 | 0-11 |
| Water | 18 | 0-54 |

The constant potential is 20 V at room temperature.

The various electrodeposition baths described above form Ni, Co, NiFe, NiCo, FeCo, NiFeCo, respectively and that the deposit is substantially Ni, Co, NiFe, NiCo, FeCo, NiFeCo, however trace quantities of other elements may be present.

A freestanding deposit layer which contains nanoporous structures after deposition may be altered by anodizing the deposit, preferably after removal from the substrate. This freestanding thin film layer has nanostructures after anodization are compared of nanoporous NiO or NiFe oxide or NiCo oxide or FeCo oxide or NiFeCo oxide layer (depending on which bath is used). It should be noted that the anodic electrolyte in a range of F$^-$ in a range of 0.01-11 g L$^{-1}$ and water in a range of 0-54 g L$^{-1}$ is used. As mentioned in the summary, anodic electrolytes and parameters are provided to prepare nanoporous freestanding layers. The anodization process may be performed to prepare oxide nanoporous layers at a constant current of 0.1-1000 mA cm$^{-2}$ or a constant potential of 5-300 V. The F ion source is NH$_4$F, HF, NaF.

Figure 1:
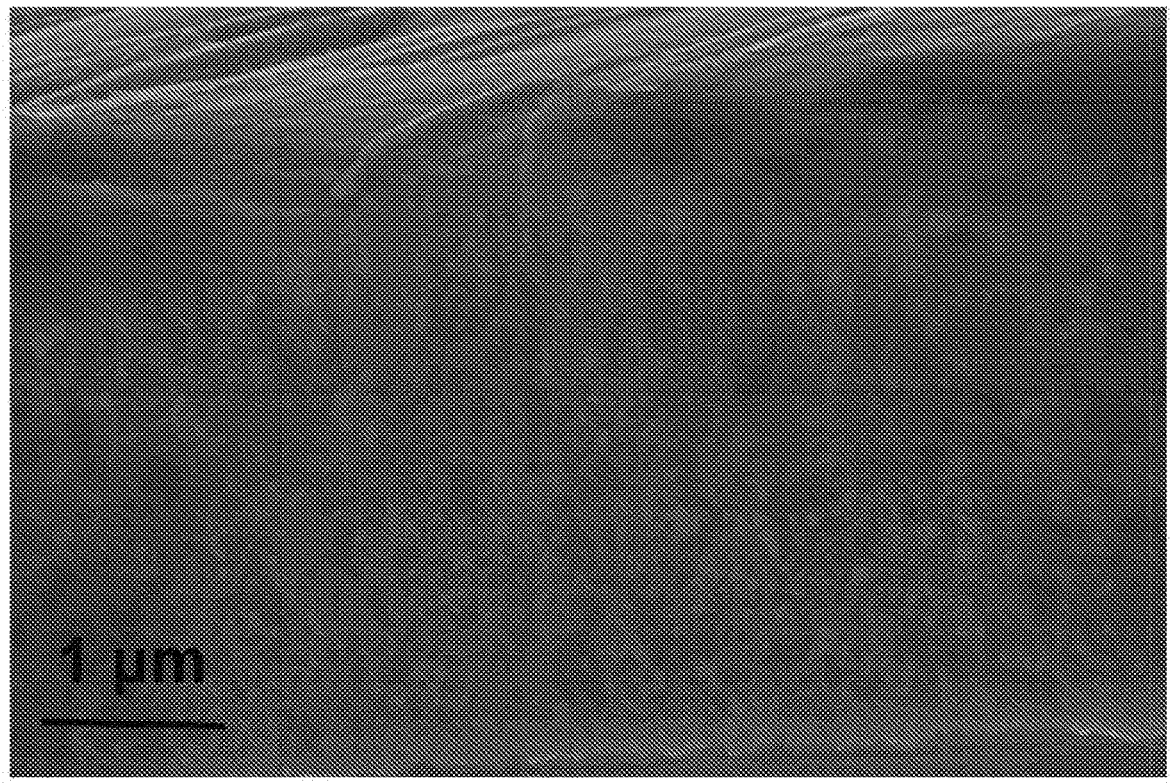
FIG. 1 shows a cross-sectional image of Ni thin film, in accordance with an embodiment.

Said freestanding layers produced have a unique nanostructure. For example, FIG. 1 presents the cross-sectional image of Ni thin film after removing the substrate. From this image, it is noted that a rough surface throughout the length of the layer, indicating that the entire layer is nanoporous after electrodeposition.

Figure 2:
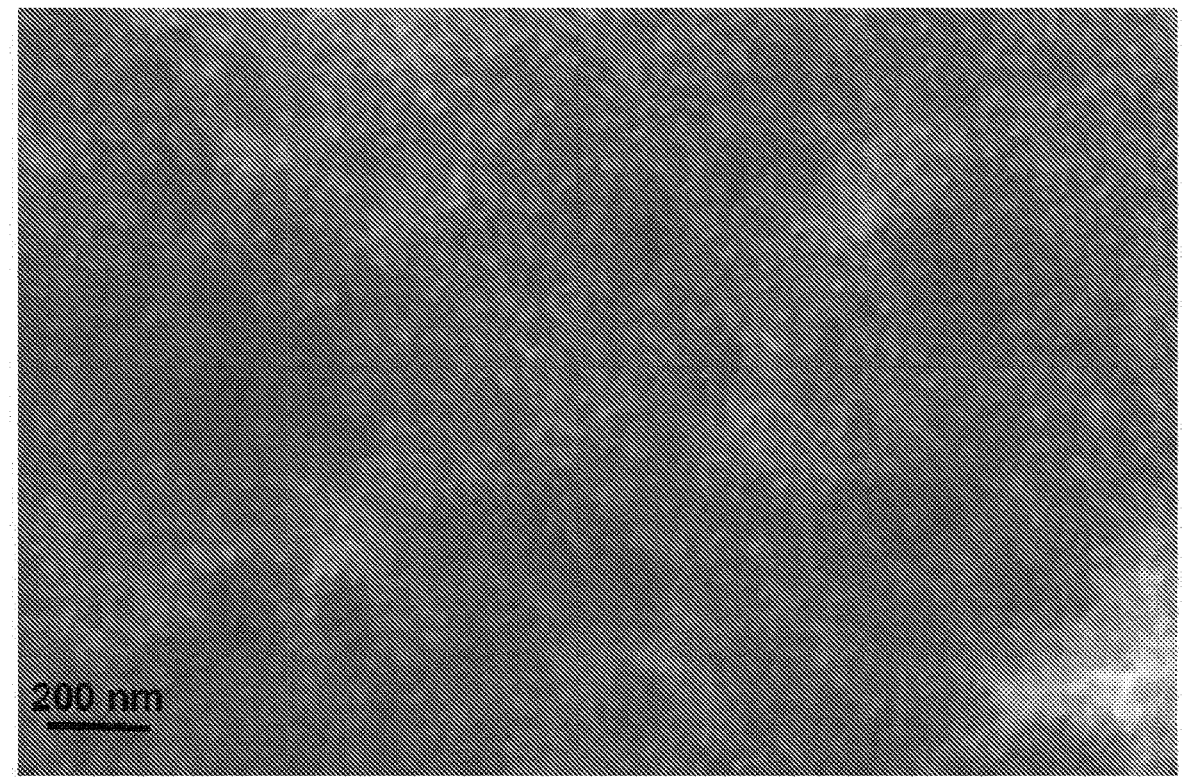
FIG. 2 displays the surface image of Ni NPF after anodization, showing surface image of NiFe oxides after anodization, in accordance with an embodiment.

FIG. 2 shows the surface image after anodization of the freestanding layer which was produced by the above described electrochemical deposition processes. It is observed that the smooth surface turned into uniformly distributed roughness surface. The pores with about 20 nm diameters were formed after anodization. In an alternative embodiment, the pore sizes may range from 15-25 nm. Alternatively, pore sizes may range from 18-22 nm.

Figure 4:
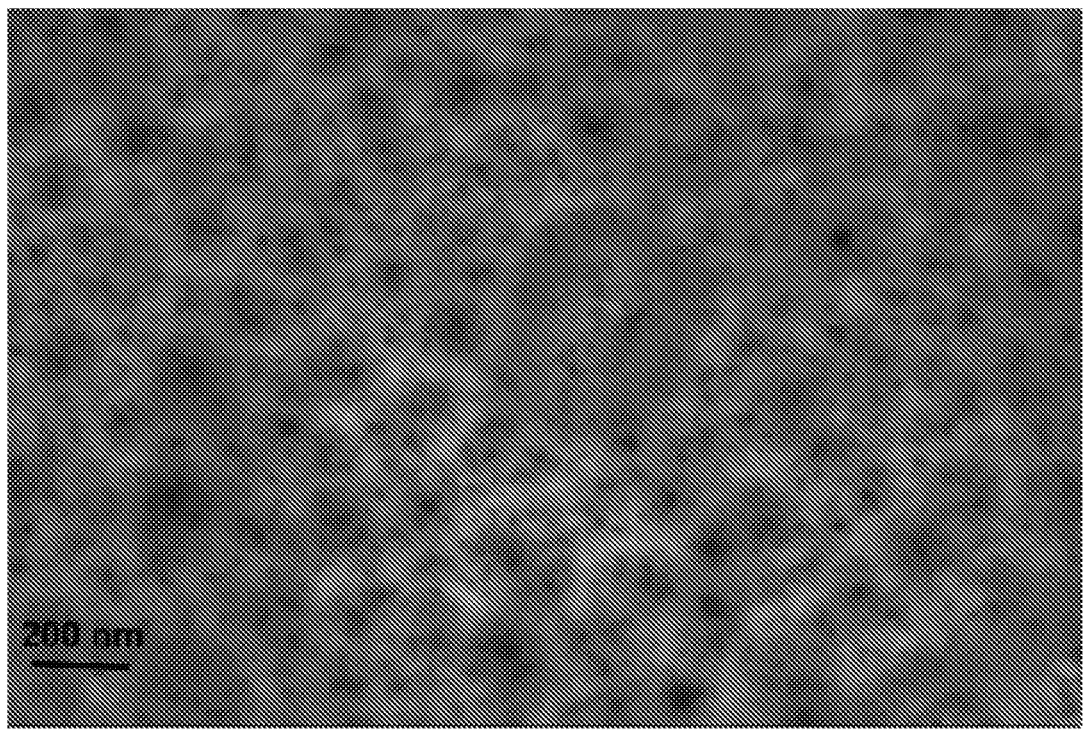
FIG. 4 presents the surface image of NiFe NPF after anodization, in accordance with an embodiment.

One of the advantages of the chemical deposition processes disclosed (e.g. electrochemical deposition using the disclosed bath compositions), is that certain metals (such as iron) may be deposited onto the substrate without oxidation. Other deposition processes (e.g., physical deposition (4)), would not permit deposition of the Fe without oxidation. In the processes disclosed, iron (Fe) is oxidized in the anodization step, thus rendering a more controlled oxidation and overall process. To this end, FIG. 4 exhibits the surface image of NiFe oxides after anodization. As shown, films produced exhibited a unique structure. High porous structures were found, with pore distribution between 10 nm and 50 nm.

Figure 5:
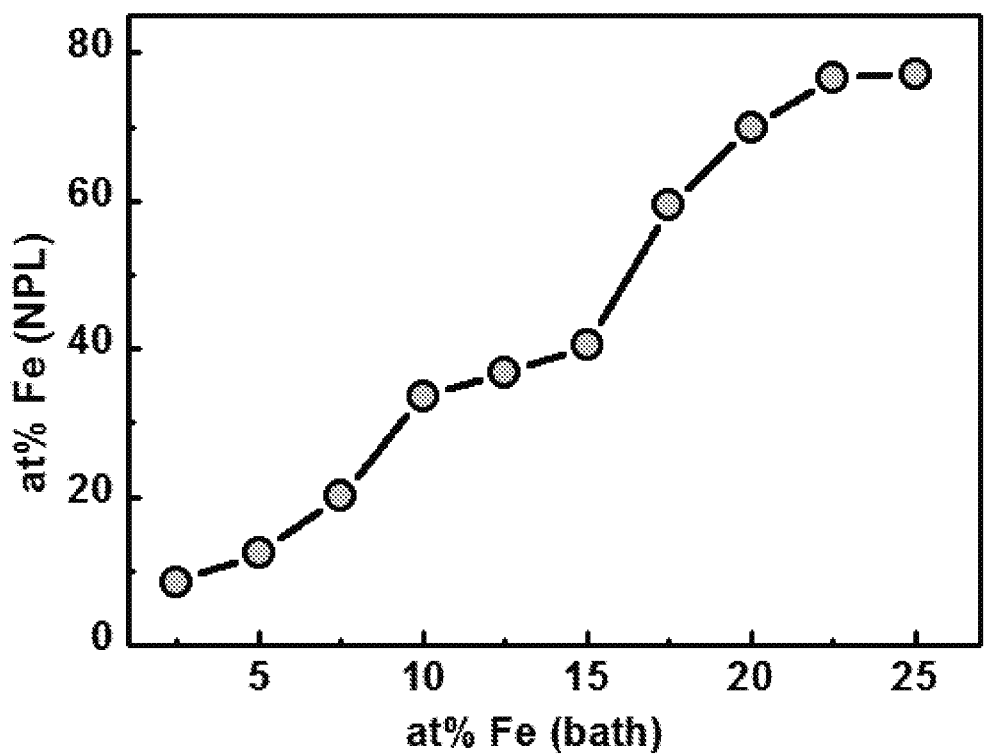
FIG. 5 is a graph showing the composition of NiFe NPF after anodization, in accordance with an embodiment.

FIG. 5 presents the variation of Fe at % in the porous layer after anodization. The Y-axis represents the Fe at % in the film after anodization and X-axis represents Fe at % in bath. The Fe at % increased fast after 15% Fe in the bath.

Figure 6:
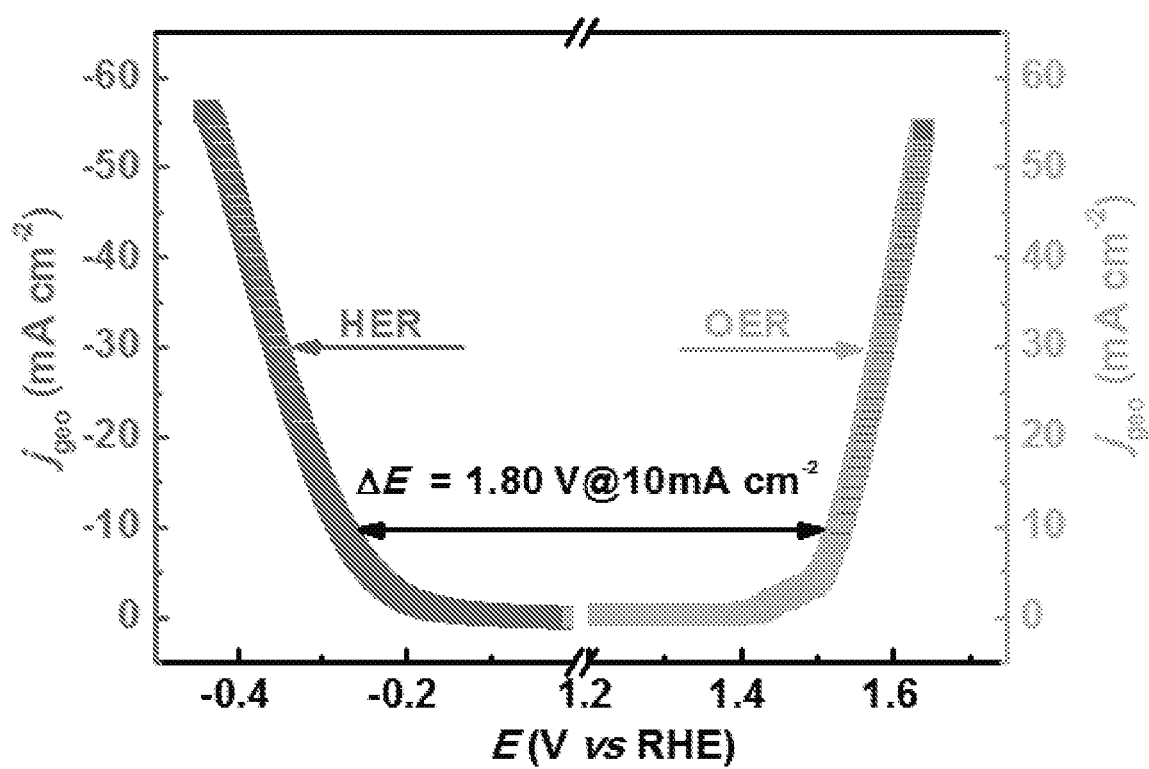
FIG. 6 illustrates bifunctional water electrolysis using NiFe oxides NPF as electrode, in accordance with an embodiment.
Figure 7:
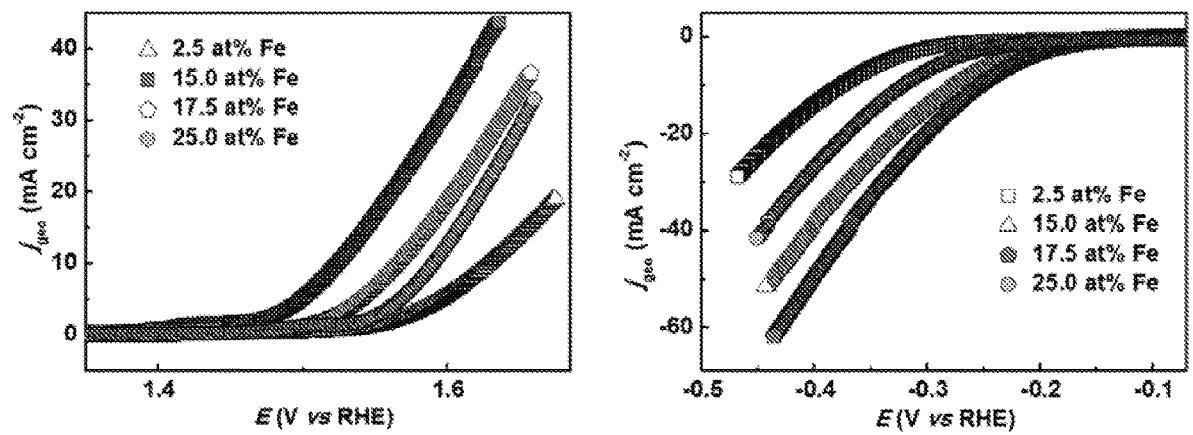
FIG. 7 provides linear sweep voltammograms oxygen evolving reaction (OER) and hydrogen evolution reaction (HER) performance characteristics of an embodiment.
Figure 8:
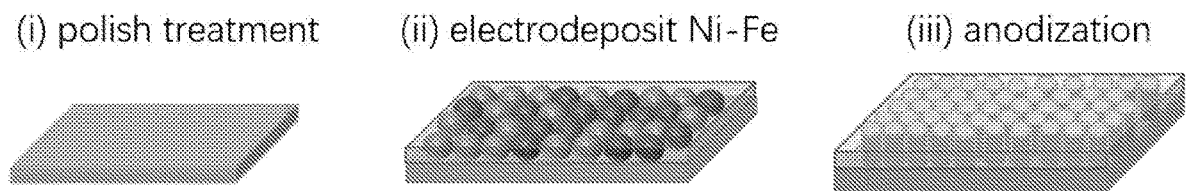
FIG. 8 shows a process for forming a NiFe oxide NPF, in accordance with an embodiment.
Figure 9:
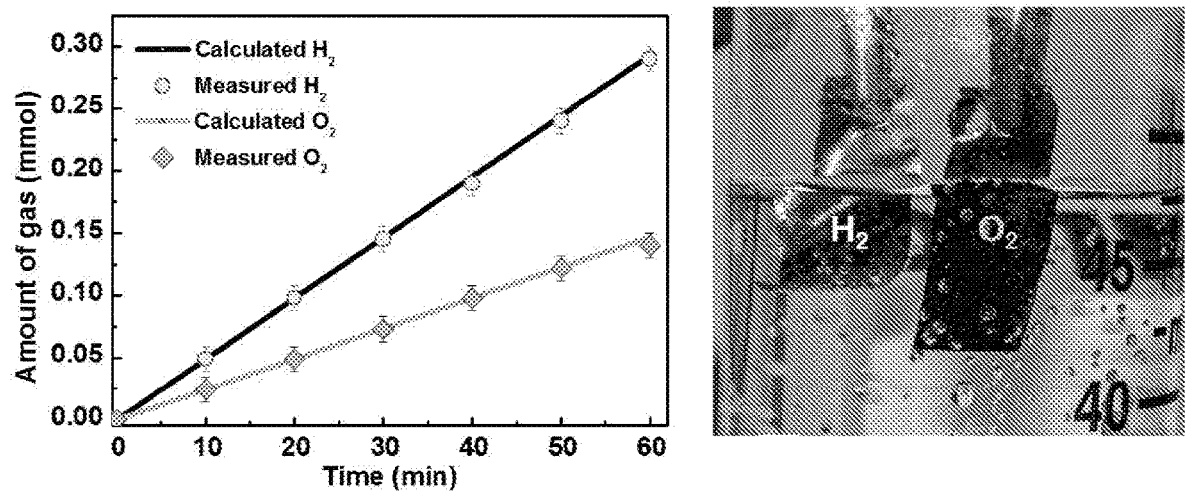
FIG. 9 is a photograph and graph showing the amount of gas produced per unit time for an embodiment film being used in two-electrode water splitting, in accordance with an embodiment.
Figure 10:
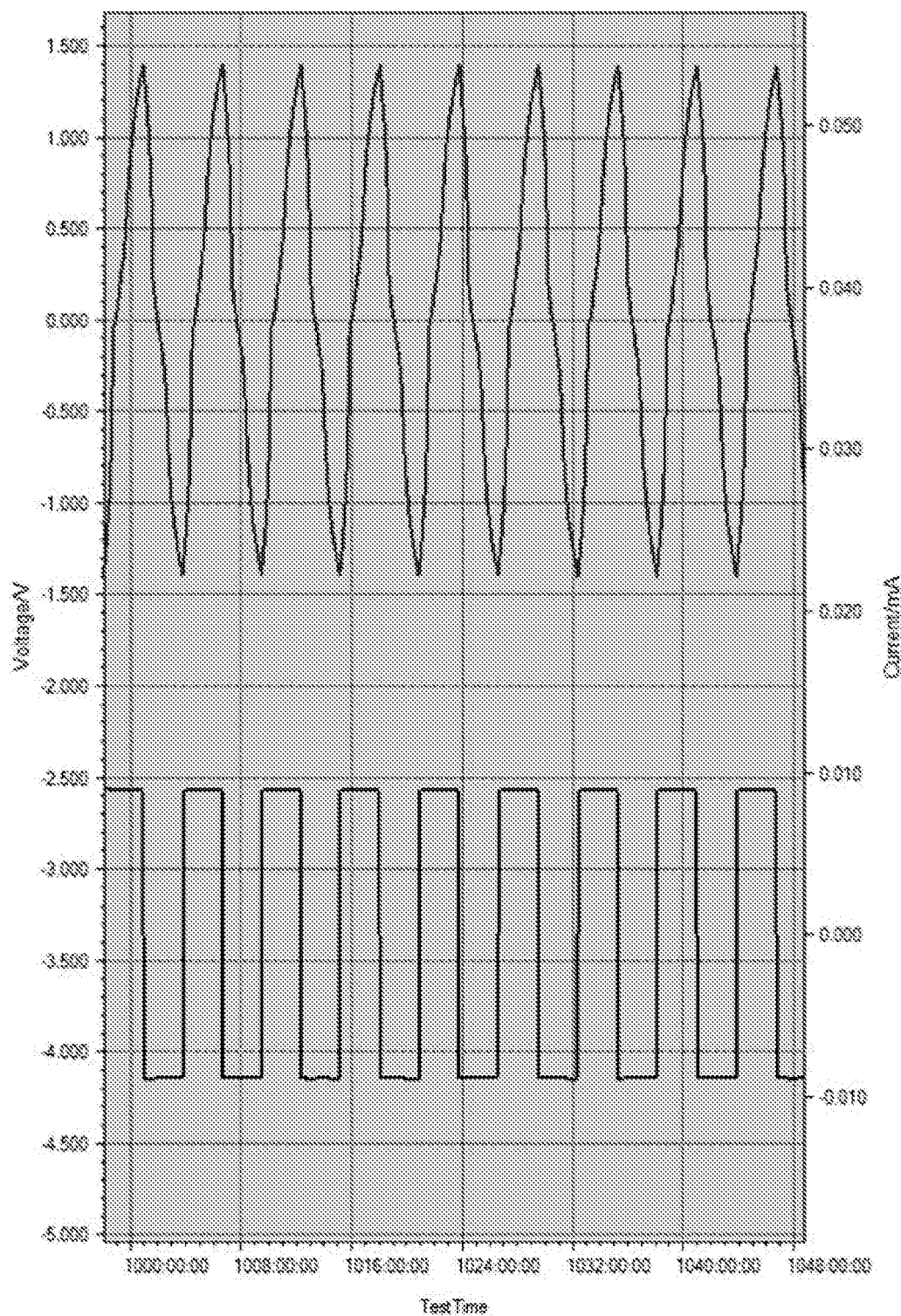
FIG. 10 is a graph showing the charge-discharge performance of an embodiment.
Figure 11:
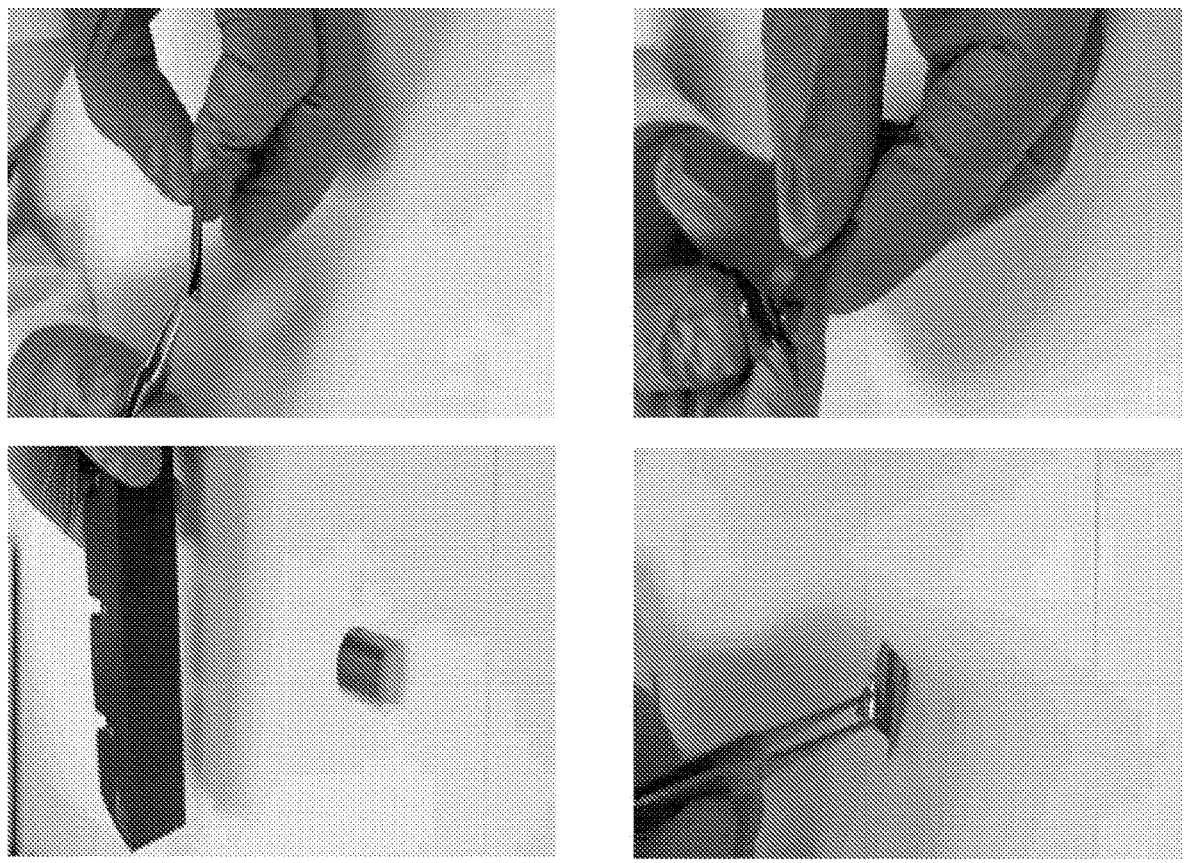
FIG. 11 is a photograph demonstrating the flexible and magnetic characteristics of an embodiment NPF.

In embodiments, the material deposited on the substrate may be removed and used as a freestanding layer. This freestanding layer may serve many purposes. In an embodiment, the freestanding layer may be an electrode and/or used as shown in FIG. 6. FIG. 6 shows the water electrolysis using NiFe oxides NPF as a single electrolyzer. From the image, 1.80 V was employed to split water. The freestanding layer and/or films disclosed may also be a supercapacitor electrode, a lithium battery electrode, a fuel cell electrode, or other similar electrode. Without limitation, they may also be used as photocatalysts, electrochemical catalysts, or photoelectrochemical catalysts, hydrogen storage materials, $CO_2$ storage materials, uranium separation and sensing materials, for seawater desalination, writing heads, compact disk material, or shielding-foil material.

Advantages over other materials include that the films produced can be removed from the substrate after deposition and/or anodization creating a product that is freestanding. Post-treatment, the substrate can be reused multiple times, in contrast to other techniques. Other techniques require the use of current collection such as gold or copper, but the presently disclosed film does not. Furthermore, the inventors herein have developed a simplistic deposition approach that does not use a physical process, but rather a chemical process which results in a nanoporosity of the film produced greater than previously possible using electrochemical deposition. The baths exemplified above comprise mainly of salts, and are easy to make and use. This reduces the amount of time spent on each sample, there is no need to use expensive equipment or substrate and our method is highly controllable. The methods disclosed also form porous nanostructures, increasing the material surface area and allowing for greater desired interactions. These porous nanostructures may be made into many shapes, sizes and thicknesses, while maintaining the same function. Finally, the material produced with the disclosed method is not in powder form and therefore does not require a binder for use as an electrode.

Example 6

$NiS_2$ Together with FeS as a Cathode for a Lithium Battery

Figure 20:
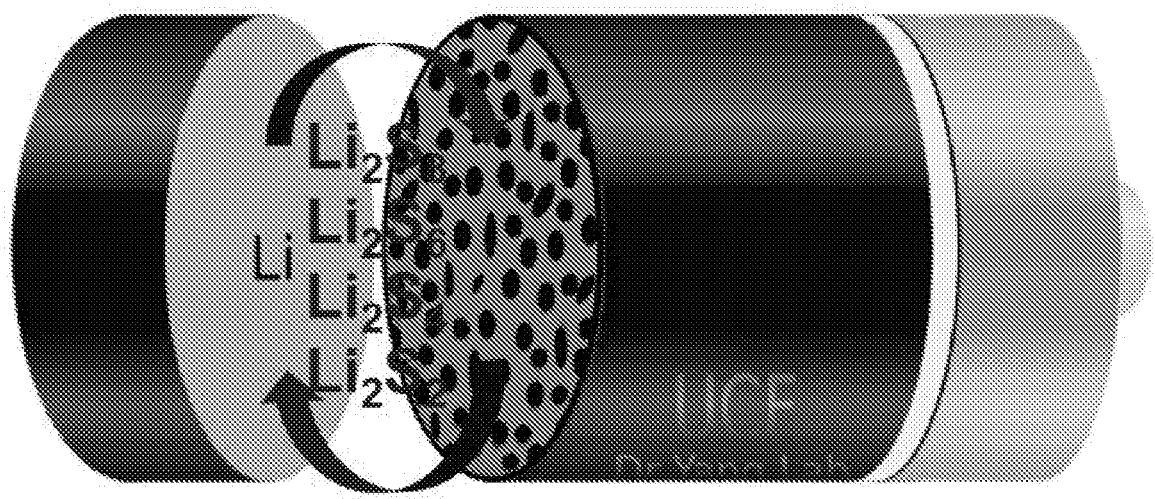
FIG. 20 shows a lithium-ion battery having a NPF film, in accordance with an embodiment.

In accordance with an embodiment, a lithium-ion battery is disclosed having the NPF. This embodiment is depicted in FIG. 20. The NPF may be the film created using the above deposition process, or it may be a film created by the deposition process and further treated. Further treatment may be anodization alone, or anodization and chemical vapor deposition (CVD) treatments. The embodiment is further described below.

In recent decades, Li-ion batteries have been implemented in many kinds of electronics, and play a crucial role in energy storage devices. With the current advances in nanotechnology, specific capacity and energy density are significantly improved. However, it is still difficult to satisfy the increasing demand for rechargeable energy storage devices. In this Example 6, composite $NiS_2$ together with FeS as cathode, is prepared for a Lithium battery. In an embodiment, a freestanding $NiS_2$/FeS nanoporous film (NPF) was prepared by an electrochemical anodic and CVD treatments, which may then be used in conjunction with a battery, which may be a lithium-ion battery.

With a two-electron reaction in the electrochemical process, Li—S batteries can a deliver high theoretical specific capacity (1675 mAh $g^{-1}$) and energy density (2567 Wh $kg^{-1}$). Therefore, Li—S batteries are one of the most promising candidates for energy storage devices. However, significant challenges still remain, such as poor conductivity of S and corresponding products ($Li_2S$ and $Li_2S_2$), shuttle effects, volume expansion and fast capacity decay. To overcome these limitations, great progress has been achieved to enhance the electrochemical performance. A flexible Li—S battery electrode with high sulfur loading by adopting grapheme foam-based electrode has been proposed in the art. The electrode retained an extremely high capacity of 13.4 mAh $cm^{-2}$ and preserved stable cycling performance with less than 0.1% capacity decay per cycle. Previous efforts have been made to develop a 3D porous N-doped graphitic carbon-Co composite by using MOF polyhedron as precursor. The material delivered a specific capacity of 1670 mAh $g^{-1}$, which is almost the same as the theoretical specific capacity.

To date, most of the efforts have been employed to develop conductive carbon-based materials as cathodes, but the nonpolar feature will reduce the interaction with polar $Li_2S$ and $Li_2S_n$, causing poor cycling performance. Very recently, inorganic host materials ($TiO_2$, $MnO_2$, $Co_9S_8$, $CoS_2$, $MoS_2$, $SnS_2$) are introduced as cathode materials to further enhance the electrochemical performance Among those metal sulfide cathodes, nickel disulfide ($NiS_2$) is a typical pyrite-type structure compound with good conductivity of 55 S $cm^{-1}$. S/$NiS_2$—C composites have been previously fabricated which show good cycling performance and delivered a specific capacity of 730 mAh $g^{-1}$ after 200 cycles at 0.5 C. It is reported that $NiS_2$ can be used as promising alternative electrocatalyst for polysulfide reduction. As one of iron sulfides, FeS possesses specific electron-transfer ability and lower band gap, so FeS shows excellent conductivity of 80 S $cm^{-1}$. With high sulfur content, $NiS_2$ can provide a high theoretical specific capacity (870 mAh $g^{-1}$). However, sluggish diffusivity of Li ion and low surface area contribute to deterioration of specific capacity.

FeS possesses excellent electron-transfer ability, therefore the $NiS_2$/FeS composite prepared as disclosed accelerates the diffusion of Li ion and intermediate phase evolution. The residual NiFe alloy substrate improves conductivity of the NPF electrode, enhancing electron transport properties. The porous structure can increase the surface area, shortening the transfer path of electron and Li ion. This NPF structure combines electron transport and ion transport to augment the electrochemical performance. Additionally, FeS can be employed as a counter electrode to improve the performance for quantum dots-sensitized solar cells, owing to superior activity for the reduction of $S_n^{2-}$ to $S^{2-}$, which can reduce the shuttle effect to improve the capacity retention and cycling performance in Li—S batteries.

It is presently disclosed that it is feasible to composite $NiS_2$ together with FeS as cathode for Lithium battery. Herein, a freestanding $NiS_2$/FeS NPF was prepared by an electrochemical anodic and CVD. With the combination of good electric conductivity and high porous structure, the $NiS_2$/FeS NPF presents superior electrochemical performance. The as-prepared electrode delivers a high specific capacity of 580 mAh $cm^3$, and exhibits small capacity decay with excellent cycling performance. Note that, the as-prepared sample is an ultra-thin freestanding NPF, which can be used for micro-sized flexible and wearable electronic devices. Therefore, volumetric capacity ($C_v$, mAh cm$^{-3}$) was employed to confirm the capacity.

A typical process to fabricate a NiS$_2$/FeS NPF is schematically illustrated in FIG. 12a. First, a NiFe thin-film with thickness of 2 μm was electrodeposited in a plating solution. This may be the bath solutions described above. Second, a freestanding NPF was achieved after removing the substrate. Next, a further treated NPF was obtained by electrochemical anodization. Lastly, a NiS$_2$/FeS NPF specific to this embodiment was finally produced after CVD treatment.

Figure 13:
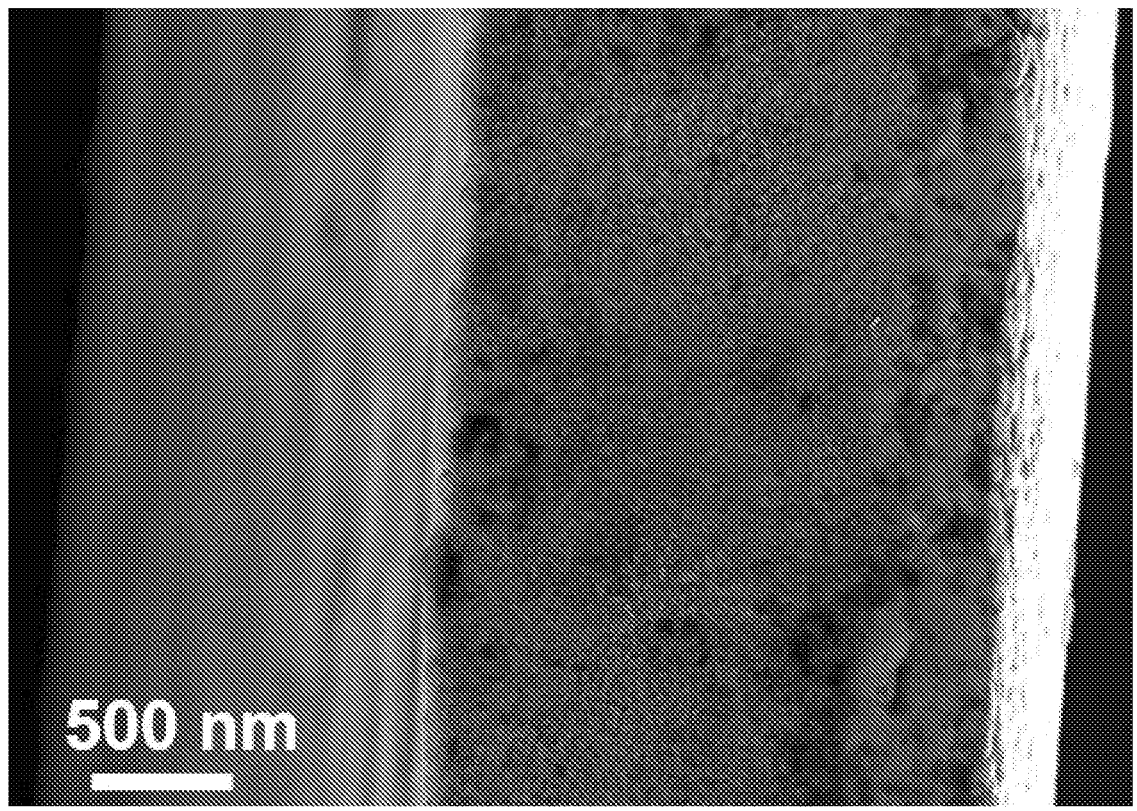
FIG. 13 is a cross-sectional SEM image of the NPF, in accordance with an embodiment.
Figures 14A, 14B:
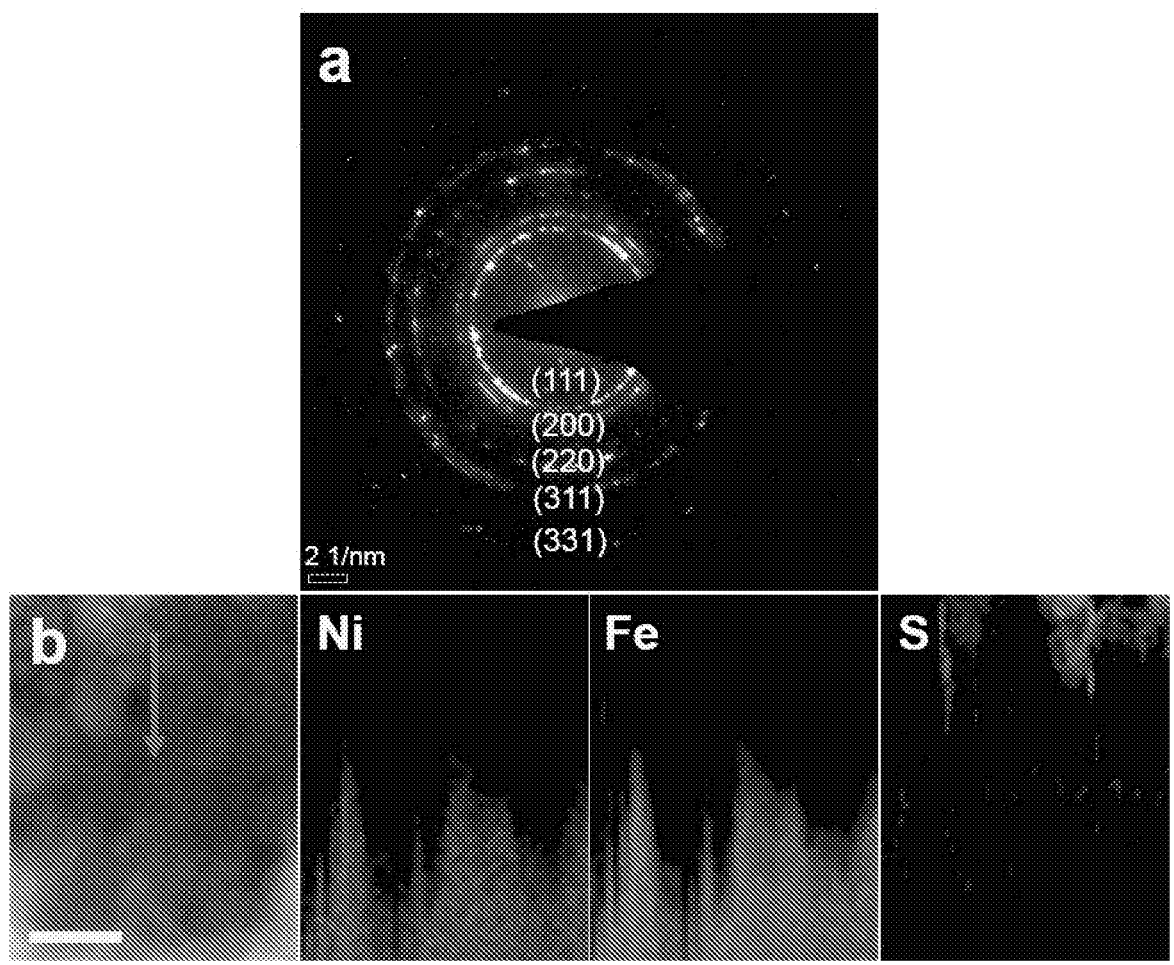
FIG. 14$a$ is a SAED of a NPF derived after focused ion beam treatment, in accordance with an embodiment.
Figure 15:
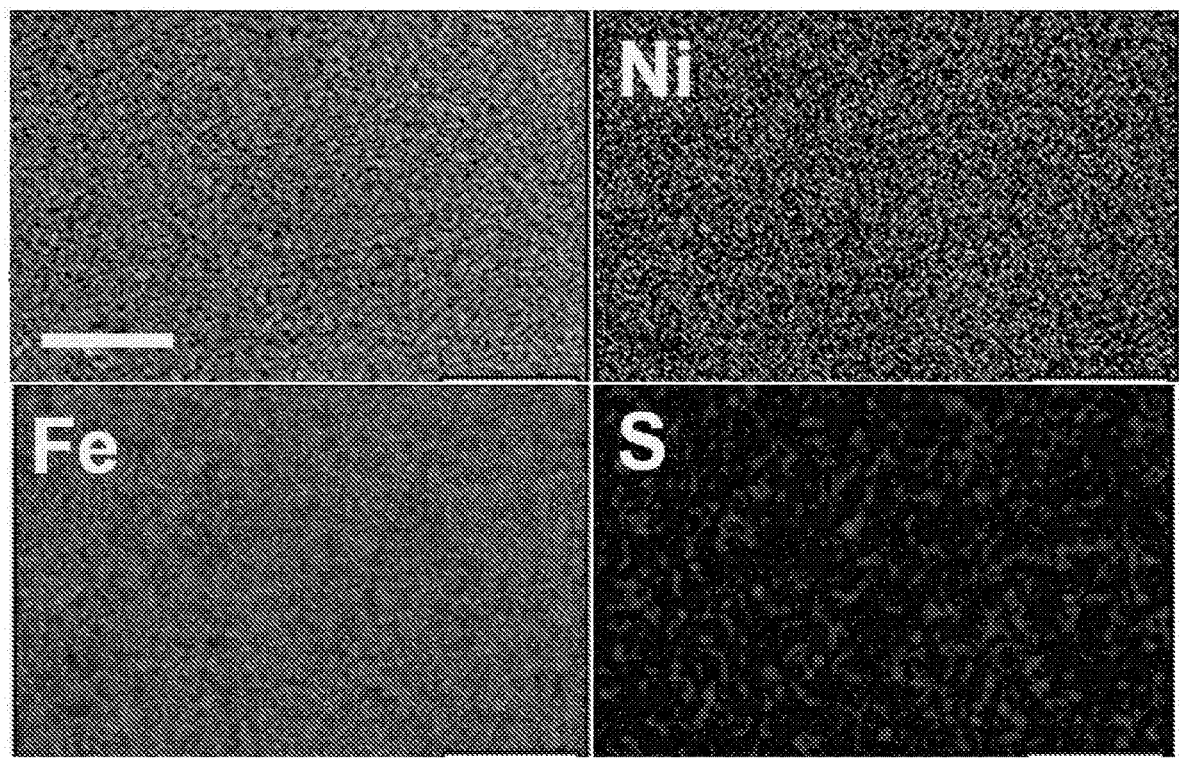
FIG. 15 is an SEM image of sulfides a film and EDS mappings of Ni, Fe and S, respectively in counterclockwise fashion, in accordance with an embodiment.

A porous structure of this NPF can be observed in FIG. 13, revealing anodic treatment is useful to create a NPF with high surface area. From the top-view scanning electron microscopy (SEM) image, a rough surface with uniform pores can be found in FIG. 12b. The pore size is mostly distributed in a range of 10-50 nm, which is typically a mesoporous structure. The morphology was further examined by transmission electron microscopy (TEM) as shown in FIG. 12c. A highly porous structure with a pore size less than 10 nm can be observed, as shown in FIG. 12c, confirming the mesoporous structure. The high porosity increases the surface area and provides numerous active sites for ion/mass diffusion, significantly enhancing the electrochemical performance. The selected area electron diffraction (SAED) pattern, as presented in FIG. 14a, confirms that only the crystalline from NiFe alloy can be observed, indicating amorphous characteristics of the sulfides HF. Energy-dispersive X-ray spectrum elemental mappings were employed, as exhibited in FIG. 14b and FIG. 15, suggesting uniform distributions of Ni, Fe and S throughout the entire HF. (FIG. 15 depicts SEM image of sulfides NPF and EDS mappings of Ni, Fe and S, respectively. The scale bar donates 1 μm).

Figure 16:
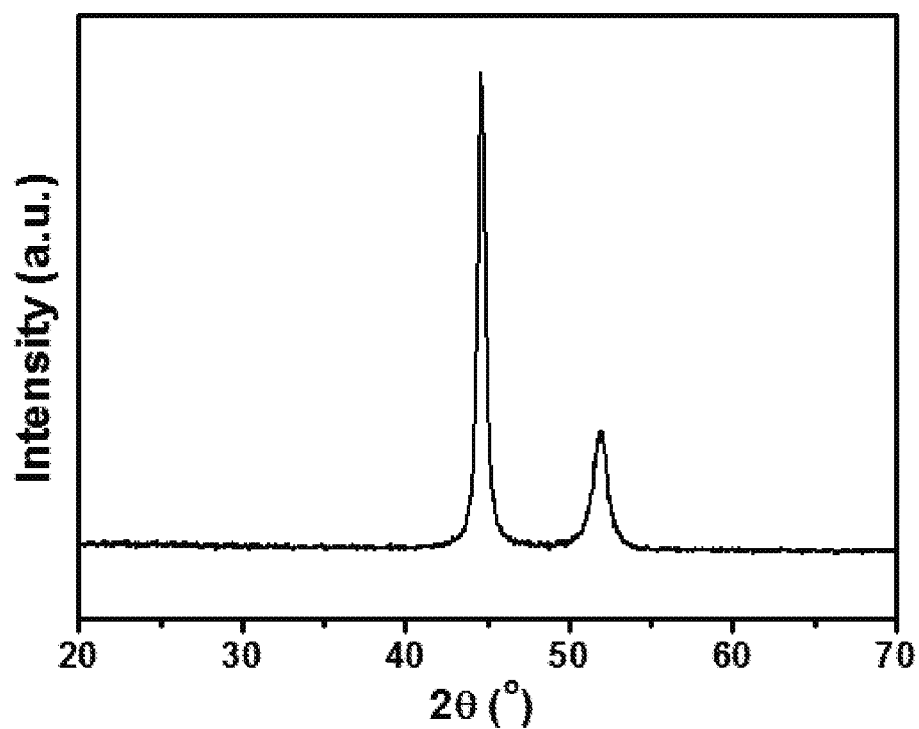
FIG. 16 is a XRD pattern of a NPF, in accordance with an embodiment.
Figure 17:
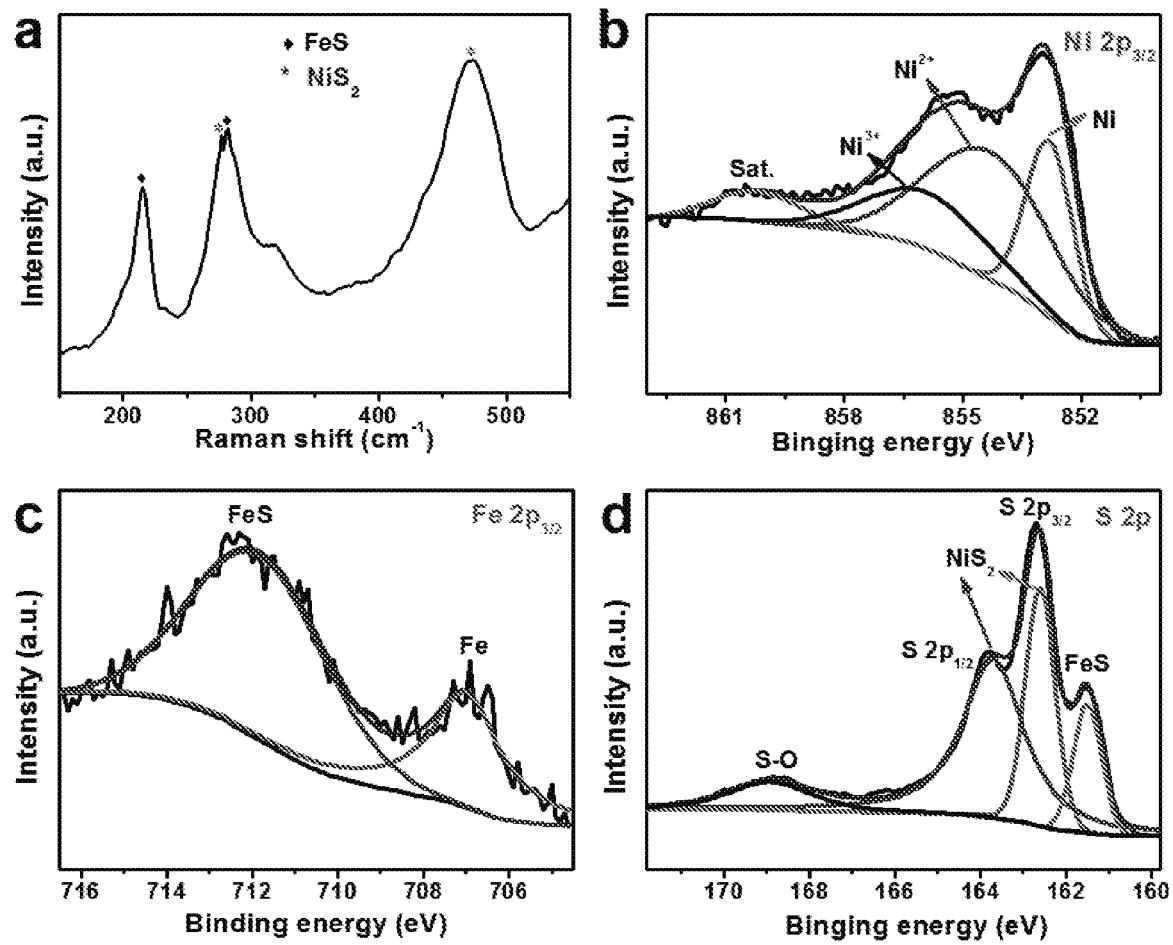
FIG. 17$a$ is a Raman spectra of the sulfides NPF, in accordance with an embodiment.

The composition of the as-prepared sulfides NPF was analyzed by X-ray diffraction (XRD) and Raman analysis. It is noted that only strong peaks from deposited NiFe alloy can be found in FIG. 16, further confirming the amorphous feature of sulfides NPF. As displayed in FIG. 17a, apparent modes at 270 cm$^{-1}$, 476 cm$^{-1}$ are well indexed with NiS$_2$ Raman feature. FIG. 17a shows the Raman spectra of the sulfides NPF. FIG. 17b-d show XPS profiles of Ni 2p$_{3/2}$ peak, Fe 2p$_{3/2}$ peak and S 2p peak, respectively. Raman scattering is sensitive to the short-range ordering, which provides a useful approach to amorphous material. Moreover, the modes from FeS at 214 cm$^{-1}$, 282 cm$^{-1}$ were identified. From the above analysis, it is known that the as-prepared NPF in this Example is a composite of amorphous NiS$_2$/FeS and crystalline NiFe alloy, which can be directly used as an electrode in lithium battery without additional current collectors. The residual NiFe alloy can be employed as a current collector, which can improve the electrical conductivity of the electrode.

Figure 18:
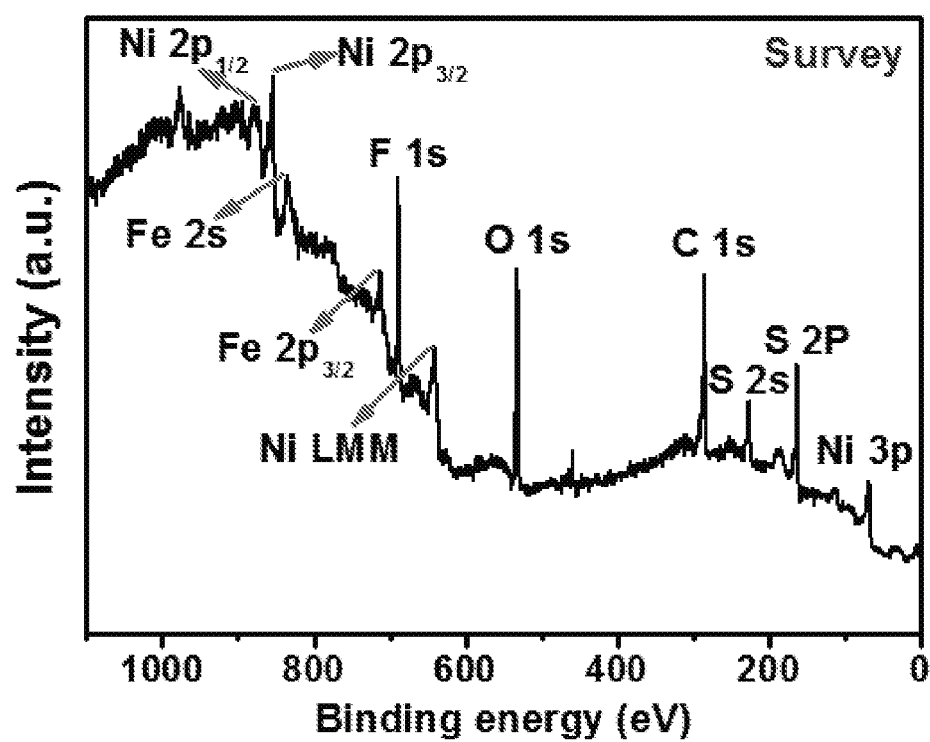
FIG. 18 is an XPS survey scan spectrum of a film, in accordance with an embodiment.

The chemical composition of sulfides NPF was investigated by X-ray photoelectron spectroscopy (XPS). In the survey scan spectrum (FIG. 18), Ni, Fe, and S can be detected, indicating the sulfides composite was prepared. High-resolution XPS profiles were performed to identify the chemical states, as presented in FIG. 17b-d. In the Ni 2p$_{3/2}$ spectrum, peak located at 852.8 eV can be ascribed to Ni metal, which mainly comes from the residual NiFe alloy. Referring to FIG. 17b, the peaks at the binding energies of 854.6 and 856.0 eV are attributed to 2p$_{3/2}$, of Ni$^{2+}$ and Ni$^{3+}$, respectively. The existence of Ni$^{3+}$ is due to Ni$_3$S$_2$ or a slight oxidation of NiS$_2$ on the surface, which is also reported previously. The ratio of Ni$^{2+}$ and Ni$^{3+}$ is estimated to be 11.3:1. Therefore, the main phase is NiS$_2$. In FIG. 17c, the Fe metal peak can be observed at 707 eV, which is derived from residual NiFe in the NPF. The Fe 2p$_{3/2}$ peak can be identified at 712 eV, consistent with a previously reported result of FeS. In the S 2p spectrum, a shoulder peak at 161.5 eV corresponding to S 2p$_{1/2}$ can be observed, which is also a characteristic peak of FeS. Two fitted peaks located at 162.6 and 163.7 eV are ascribed to the sulfur binding energies of S 2p$_{3/2}$ and S 2p$_{1/2}$ in NiS$_2$. A slight shift toward lower binding energy can be found in S 2p$_{3/2}$, due to local band bending effects on the FeS and Ni$_3$S$_2$ surfaces. The peak with binding energy of 168 eV is ascribed to the S—O covalent bond, owing to sulfur oxidation in air. The reason why S—O cannot be detected in the XRD curves is probably owing to the low concentration in the NPF.

A standard CR 2032 coin cell was assembled to evaluate the electrochemical performances of the amorphous NiS$_2$/FeS NPF cathodes. Cyclic voltammetry (CV) with a scan rate of 0.1 mV s$^{-1}$, was performed in a voltage window of 1.6-2.8 V to test electrochemical behavior. As presented in FIG. 19a, a reduction peak located at 1.85 V may be owing to the transformation of sulfides to Li$_2$NiS$_2$ and Li$_2$FeS. Another strong peak at 1.68 V contributes to the further from Li$_2$S to lithium polysulfides (LiPSs). One oxidation peak with voltages of 2.22 V reveals the reversed conversion. While the other weak oxidation peak at 2.4 V is owing to the soluble Li$_2$S$_8$ to S$_8$. Moreover, the peaks current weakens in the 2$^{nd}$ and 3$^{rd}$ cycles, due to the as-produced polysulfide reaction with electrolyte. Small shifts in reduction and oxidation peaks can be observed, denoting a decrease in polarization, which is helpful in improving the cycling performance.

Galvanostatic charge-discharge profiles with different current densities were carried out to further analyze the electrochemical performance. As shown in FIG. 19b, two plateaus around 1.9 and 1.8 V can be observed in discharge curve, associated with the formation of Li$_2$NiS$_2$ and Li$_2$FeS and long-chain LiPSs. FIG. 19b reflects charge-discharge profiles with different current densities. Moreover, the two-step discharge process implies sluggish electrochemical kinetics. In the charge curve, only a single plateau at 2.2 V is observed, which can be attributed to low Li$^+$ diffusion and can be explained with the combination of equations (1) and (2), below. Since the active materials are typical conversion-type cathodes, the transfer mechanism can be described as follows:

$$NiS_2 + 4\ Li \leftrightarrow Ni + 2Li_2S \quad (1)$$

$$FeS + 2Li \leftrightarrow Fe + Li_2S \quad (2)$$

$$nLi_2S \leftrightarrow (2n-2)Li + Li_2S_n \quad (3)$$

With a small current density of 10 mA cm$^{-3}$, the sulfides electrode can deliver the highest specific capacity of 580 mAh cm$^{-3}$. With an increase in current density, the charge plateaus maintain stable, while the discharge plateaus and capacity decrease, which is due to the higher resistance and kinetic overpotentials at higher current densities.

Figure 21:
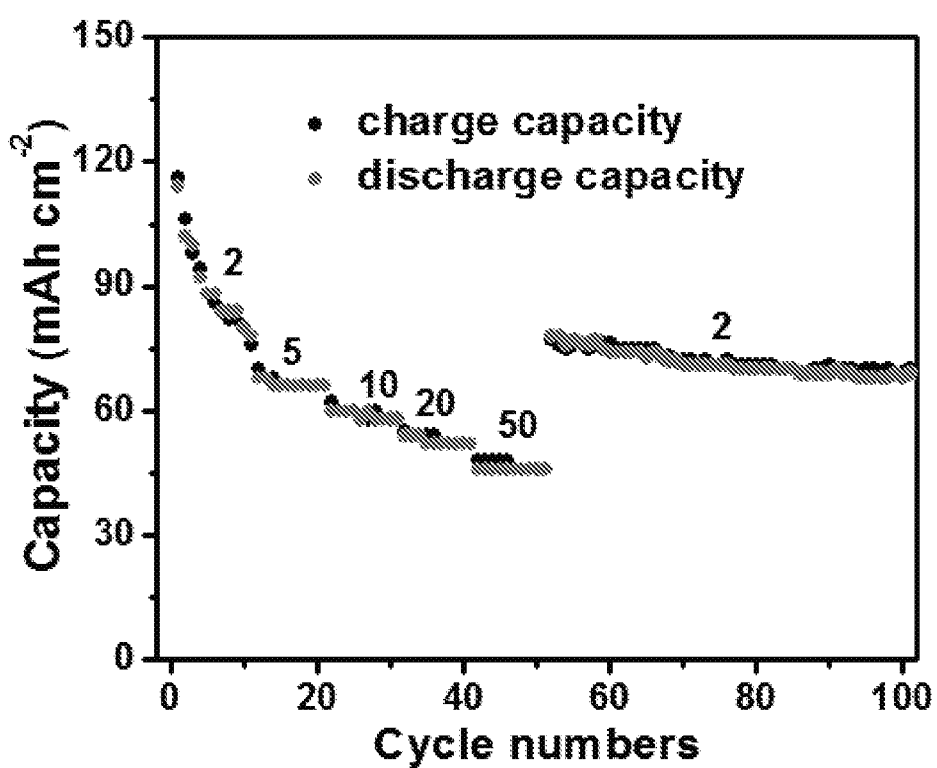
FIG. 21 shows the rates capability of a sulfides NPF electrode, in accordance with an embodiment.

FIG. 19c shows the Rate performance. The unit of the current density is mA cm$^{-3}$. The rate performance at current densities from 10 mA cm$^{-3}$ to 250 mA cm$^{-3}$ was further investigated, as presented in FIG. 19c and FIG. 21. The specific capacity is decreased from 580 mAh cm$^{-3}$ (116 μAh cm$^{-2}$) to 230 mAh cm$^{-3}$ (46 μAh cm$^{-2}$) with increasing current density. The retention of capacity is calculated to be about 40%. However, the discharge capacity can return up to 390 mAh cm$^{-3}$ (78 μAh cm$^{-2}$) when the current density is reduced to 10 mA cm$^{-3}$, indicating excellent rate capability.

The areal capacity of sulfides NPF is higher than those of most commercial micro-battery systems, but lower than those of Li—S battery systems, due to the low sulfur mass (See Table 11, below).

TABLE 11

Areal capacity and energy density.

| Materials | Specific capacity ($\mu$Ah cm$^{-2}$) | Reference |
|---|---|---|
| (1) NiS$_2$/FeS | 116 | This work |
| (2) LiCoO$_2$ | 125 | Previously reported |
| (3) LiCoO$_2$ | 85.8 | Previously reported |
| (4) LiCoO$_2$ | 22 | Previously reported |
| (5) LiCoO$_2$ | 68 ± 2 | Previously reported |
| (6) LiFePO$_4$ | 54 | Previously reported |
| (7) LiNi$_{0.8}$Co$_{0.2}$O$_2$ | 23.6 | Previously reported |
| (8) FePO$_4$ | 22 | Previously reported |
| (9) Al$_2$O$_3$/S | 3370 | Previously reported |
| (10) MPNC-S | 3300 | Previously reported |
| (11) Graphene-S/Al$_2$O$_3$ | 980 | Previously reported |
| (12) V$_2$O$_5$-CNT/TiO$_2$ | 800-1200 | Previously reported |

Numbers (2)-(8) in the above table are micro-battery systems, and (9)-(12) are Li—S battery systems, and is a lithium-ion battery. The specific capacity is calculated based on the mass of electrodes.

The areal capacity meets the requirement for micro-sized flexible and wearable electronic devices.

Figure 19:
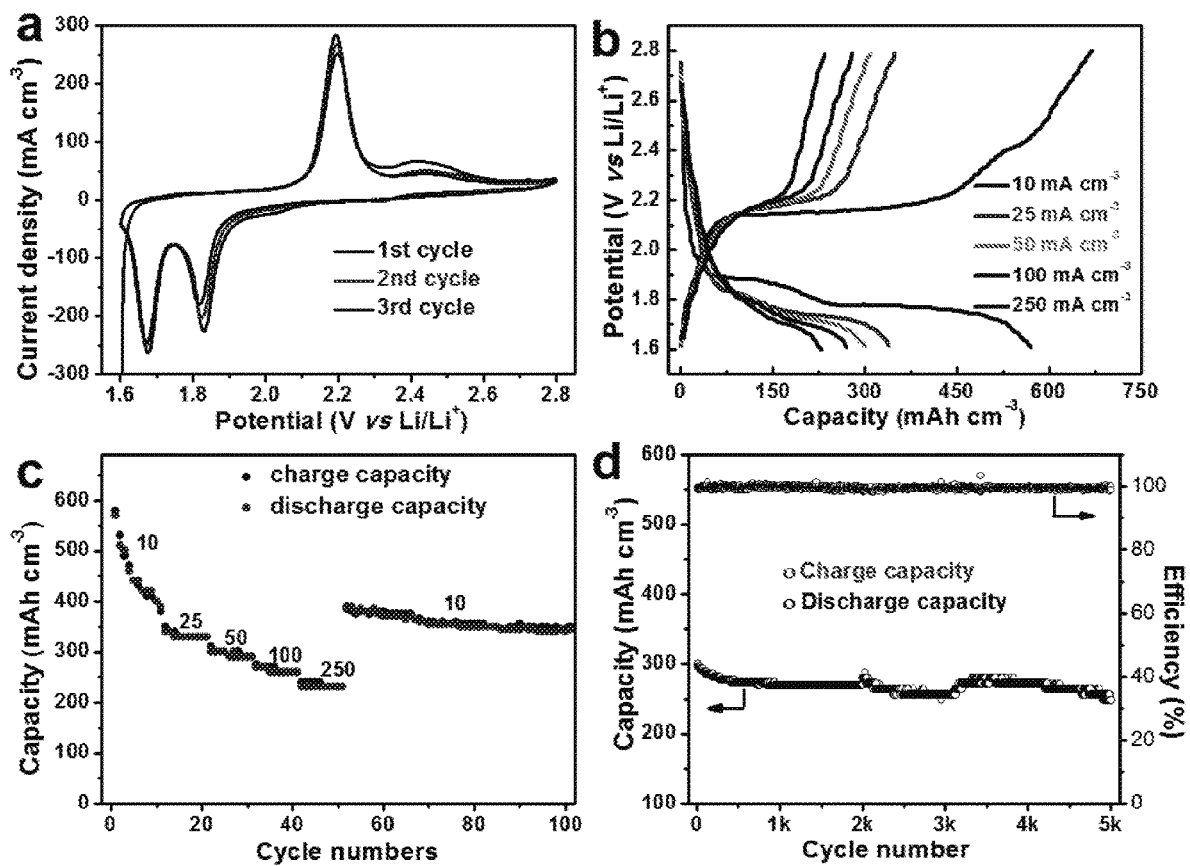
FIG. 19$a$ are cyclic voltammograms at a scan rate of 0.1 mV/s, in accordance with an embodiment.

To further confirm the electrochemical performance, the long-term cycling test was performed at a current density of 50 mA cm$^{-3}$. FIG. 19$d$ shows the long-term cyclability at a current density of 50 mA cm$^{-3}$. As exhibited in FIG. 19$d$, the as-prepared sulfides NPF still showed excellent cycling performance at a higher current density. The electrode retained a specific capacity of 270 mAh cm$^3$ after 1000 cycles. The specific capacity decay rate is only 0.01% per cycle, which is better than that of previously reported. The corresponding Coulombic efficiency of the electrode was nearly 100%, further demonstrating the excellent Li storage mechanism. The specific capacity of 580 mAh cm$^{-3}$ is nearing that of most commercial cathodes (See Table 12).

TABLE 12

Volumetric capacity and energy density.

| Materials | Specific capacity (mAh cm$^{-3}$) | Energy density (mWh cm$^{-3}$) | Reference |
|---|---|---|---|
| (1) NiS$_2$/FeS | 580 | 1044 | This work |
| (2) S/(G-GCNs) | 1362 | 1231 | Previously reported |
| (3) MNCS/CNT | 1140 | 2508 | Previously reported |
| (4) Co$_9$S$_8$ | 4.7-11 | 23.6-56 | Previously reported |
| (5) MWCNT/MnO$_2$ | 94.37 | 92.84 | Previously reported |
| (6) MWCNT/Lithium oxides | — | 17.7 | Previously reported |
| (7) LiNi$_{0.8}$Co$_{0.2}$O$_2$ | 191 | — | Previously reported |
| (8) LiCoO$_2$ | 690 | — | Previously reported |
| (9) LiCoO$_2$ | 680 ± 2 | — | Previously reported |
| (10) LiCoO$_2$ | 640 | — | Previously reported |
| (11) LiFePO4 | 540 | — | Previously reported |

*(2)-(4) are Li—S battery systems, and (4)-(11) are micro-battery systems. The specific capacity and energy density are calculated based on the mass of cathodes.

The as-prepared electrode can deliver an energy density of 1044 mWh cm$^{-3}$, which is higher than that for most thin-film Li—S batteries (See Table 11). Due to the low sulfur mass and low contribution of NiS$_2$/FeS active mass in the electrode, the capacity and energy density values are still lower than those of S-based Li—S battery, but, it is a new way to develop thin-film electrode for Li—S battery.

The interfacial interactions between the active materials and LiPSs was characterized by investigating first-principle calculations based on density functional theory (DFT). A 2×2×1 supercell of (NiS$_2$)$_{0.6}$(FeS)$_{0.4}$-(001) plane was built to simulate the adsorption of Li$_2$S$_2$. Theoretical calculations demonstrate that the Li$_2$S$_2$ should interact with the outermost sulfur atoms in prior to obtain stable phase and the calculated binding energy was 1.92 eV, which is smaller than that of NiS$_2$. The smaller binding energy means that the sulfide composite presents stronger corresponded to the moderate LiPSs than the host materials.

Figure 22A:
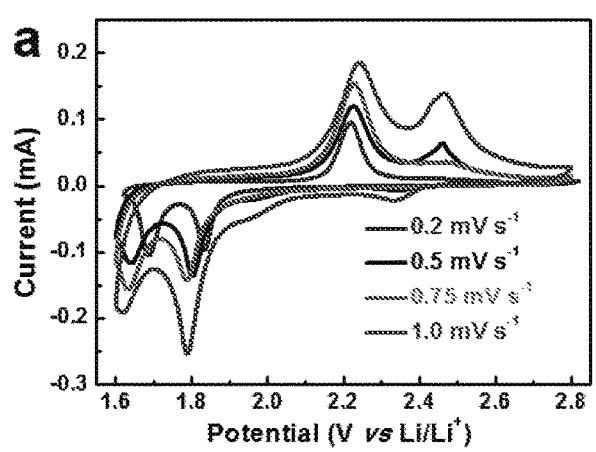
FIG. 22$a$ shows CV curves with different scan rates after 5$^{th}$, 10$^{th}$, 15$^{th}$, and 20$^{th}$ cycles, in accordance with an embodiment.
Figure 22B:
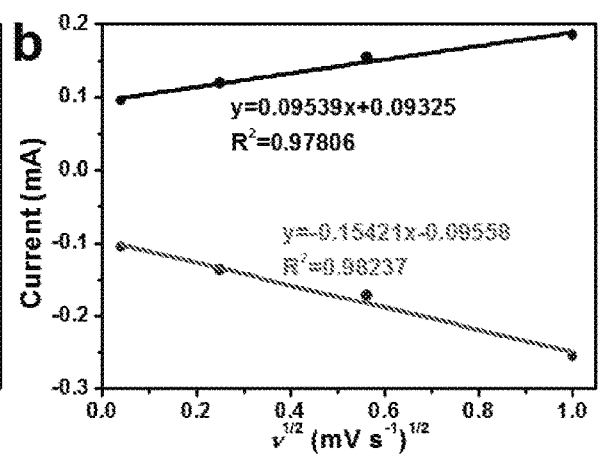

In order to further understand the kinetics of Li-ion insertion/extraction at the interface of electrolyte and electrode and the rate of Li diffusion in NPL, CV measurements were performed at different scan rates. As shown in FIG. 22$a$, CV curves were recorded at scan rates of 0.2, 0.5, 0.75, and 1 mV s$^{-1}$ after 5$^{th}$, 10$^{th}$, 15$^{th}$, and 20$^{th}$ cycles. The voltage window was set to 1.6-2.8 V. It is noted that the peak current increased with increasing the scan rates. The peak current vs square root of scan rate was fitted, as present in FIG. 22$b$. The slopes of the anodic and cathodic peak are 0.09 and 0.15, respectively, indicating diffusion-limited reactions. In this kind of reaction, the peak current and scan rates follow the Randles-Sevcik equation:

$$I_p = (2.69 \times 10^5) n^{3/2} A D_{1/2} v^{1/2} \Delta C_0 \qquad (4)$$

where $I_p$ is the peak current, n is the numbers of transfer electron, A is the surface area of electrodes, D is the diffusion coefficient, v is the scan rate, and $\Delta C_0$ is the concentration of reaction. It is worth pointing out that the slope of cathodic peak is higher than that for anodic peak, reflecting the anodic peak covers higher Li-ion transfer coefficient. The electrode before and after 10, 100, 1000 cycles clearly shows similar bulk solution resistance, indicating just very little Li$_2$S$_x$ dissolved in the electrolyte. The diameter of the semi-circle, meaning the charge transfer resistance, becomes larger after further cycles, owing to the formation of LiPSs. Warburg resistance is associated to Li-ion diffusion. According to the slope of inclined line in medium-low frequency region, it is found that the Li-ion diffusion is much harder after cycling test, owing to the poor conductivity of as-produced LiPSs to render rapid electron transport in electrode.

Electrochemical impedance spectroscopy (EIS) and corresponding equivalent circuit are displayed in FIGS. 23a and 23b, respectively. The equivalent circuit model shown in FIG. 23b represents the internal resistance of the test battery. The high-frequency semicircle corresponds to the bulk solution resistance ($R_s$), the semicircle in the medium-frequency region is assigned to the charge-transfer impedance ($R_{ct}$) and constant phase element of electrode/electrolyte interface (CPE), and W is associated with the Warburg impedance corresponding to the lithium-diffusion process.

All above, the freestanding sulfides NPF exhibits excellent electrochemical performance as a Li—S battery, due to following reasons: (i) Porous structure provide a large surface area and more active sites/channels/pathways to enhance the ion/mass diffusion. Moreover, the porous structure can also reduce the damages from volumetric expansion. (ii) The NPF composite the current collector (residual NiFe alloy) and active materials (sulfides) together, reducing the resistance of the electrode. Additionally, the good conductivity of HF can improve electron transport; (iii) The sulfides are more stable as active materials than sulfur, showing only a small capacity decay while retaining high cyclability performance.

In summary of this Example, a freestanding $NiS_2/FeS$ NPF was prepared after electrochemical anodic and CVD treatments. With the combination of good electrical conductivity and highly porous structure, the $NiS_2/FeS$ NPF presents superior electrochemical performance and may be used for a high energy and stable electrode for Li—S battery.

Example 7

Freestanding and Nanoporous NiFe Oxides for Supercapacitor

In accordance with another embodiment, NPFs are prepared for use as a supercapacitor. The as-prepared NiFe oxides thin films are highly porous and have an amorphous phase that delivered much higher specific capacitance than the annealed samples, revealing that the NPFs possess enhanced electrochemical performance for energy storage.

Figure 24:
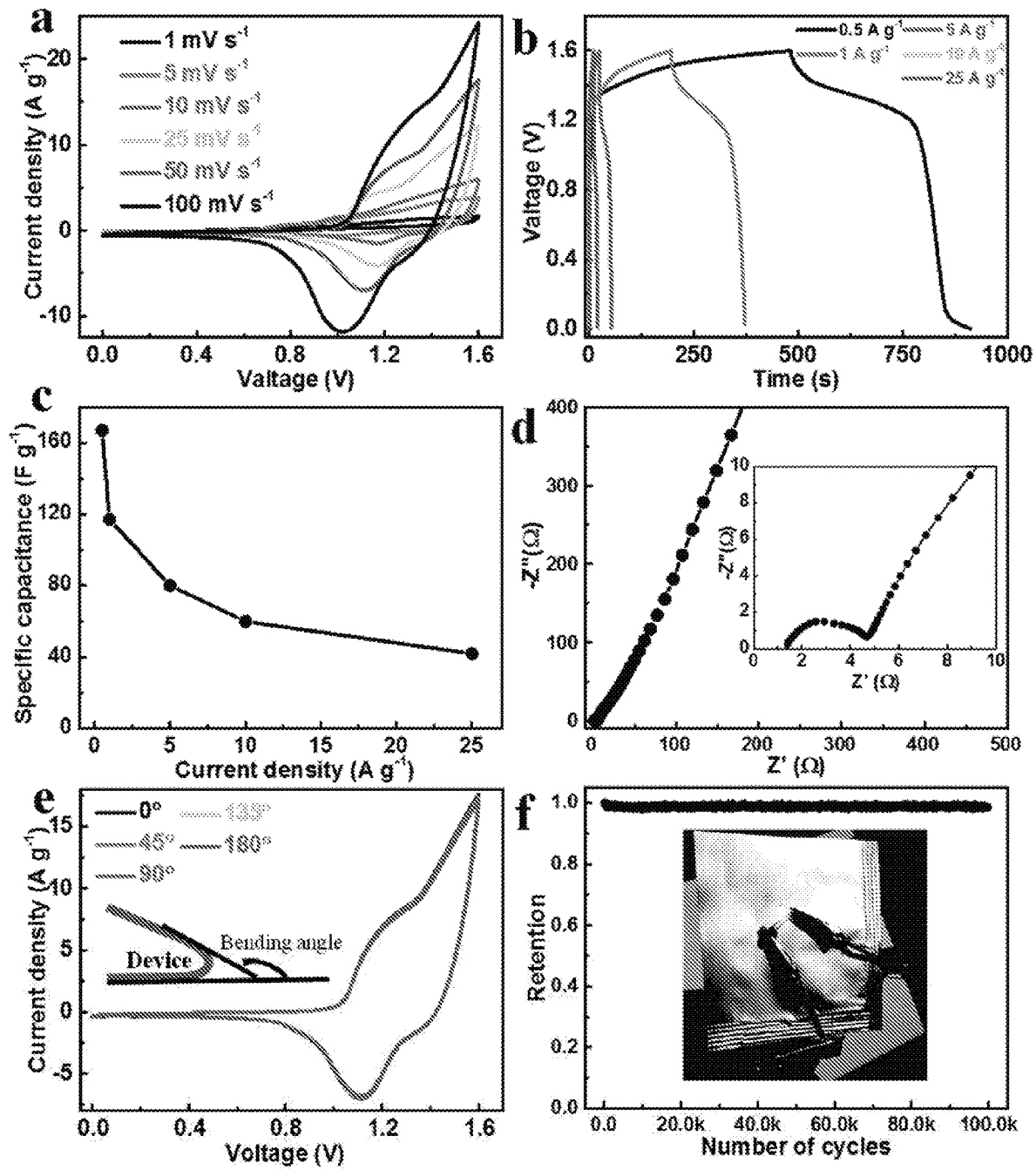
FIG. 24$a$ shows CV curves performed at different scan rates, in accordance with an embodiment.

FIG. 24a-f shows electrochemical performance for a flexible asymmetric supercapacitor using the as-prepared freestanding and nanoporous NiFe oxides NPF (15.0 at % Fe, FIGS. 25a and b, arrow indicating 15.0 at %) FIG. 24a shows CV curves performed at different scan rates.

Another pair of redox peaks at 1.4 V and 1.1 V can be ascribed to $Ni(OH)_2+OH^-\rightleftharpoons NiOOH+H_2O+e^-$. Galvanostatic charge/discharge (GCD) curves (FIG. 24b) at different current densities were also tested. FIG. 24b shows charge/discharge profiles obtained at different current density. The shoulders at 1.4 V in charging and 1.2 V in discharging also reveal redox reactions responsible for the energy storage mechanism in the developed flexible supercapacitors, which agree well with the CV curves. Specific capacitance of 167 F $g^{-1}$ was achieved at current density of 0.5 A $g^{-1}$ (FIG. 24c). FIG. 24c is a graph showing the variation of specific capacitance with different current density, each demonstrating suitability of the NPFs for use as supercapacitor embodiments.

Figure 31:
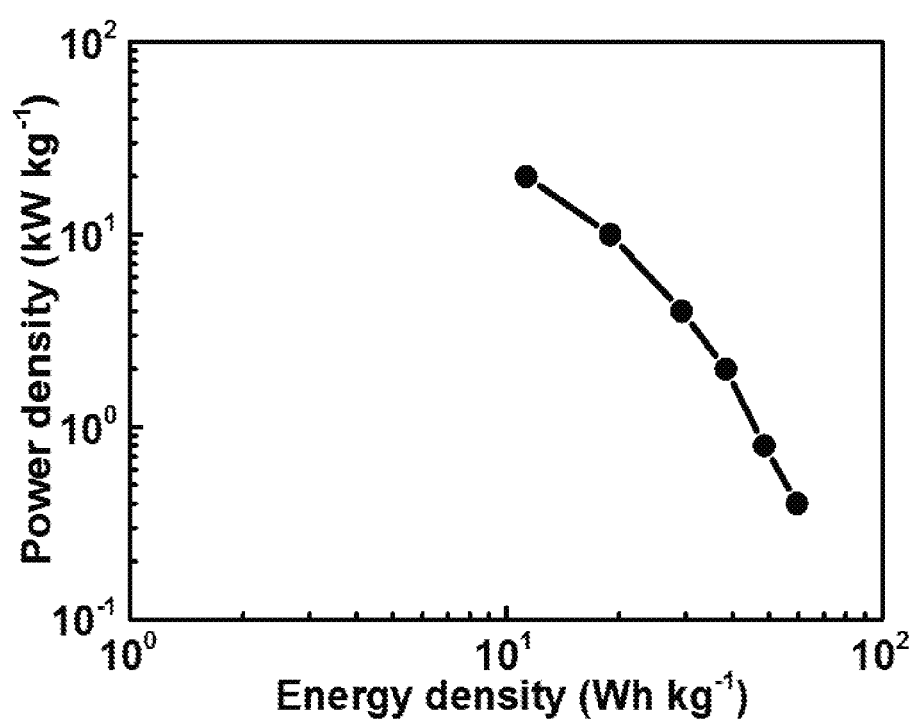
FIG. 31 is a Ragone plot taken of an embodiment film.

Energy and power densities were calculated (Ragone plot, FIG. 31) to be 59.4 Wh $kg^{-1}$ and 20 kW $kg^{-1}$, respectively, which are promising values for flexible and wearable energy storage. FIG. 24d is a graph showing the electrochemical impedance spectroscopy of the device with inset of enlarged high-frequency region. EIS was employed to understand the electrochemical kinetics of the flexible devices. In the high-frequency region, an equivalent series resistance of 1.4Ω was obtained, suggesting good conductivity of the flexible device.

Charge transfer resistance of 3.3Ω was obtained, which indicates a facilitated charge transfer at the electrode/electrolyte interface. CV curves at a scan rate of 50 mV $s^{-1}$ were investigated to evaluate supercapacitor flexibility at different bending angles. FIG. 24e are CV curves with different binding angles at 50 mV $s^{-1}$. The CV curve overlap suggests excellent flexibility performance for the developed supercapacitor. Long-term asymmetric supercapacitor cycling performance was tested at a current density of 10 A $g^{-1}$ for 100 k cycles (FIG. 24f), exhibiting a capacitance retention of 98.5% at the end of cycling test. Moreover, the assembled asymmetric supercapacitor can easily illuminate a light-emitting diode (LED, inset in FIG. 24f). FIG. 24f are cycling performance at 10 A $g^{-1}$. In FIG. 24f, a digital photograph is inset of yellow illuminated LED powered by the assembled asymmetric supercapacitor.

Figure 25:
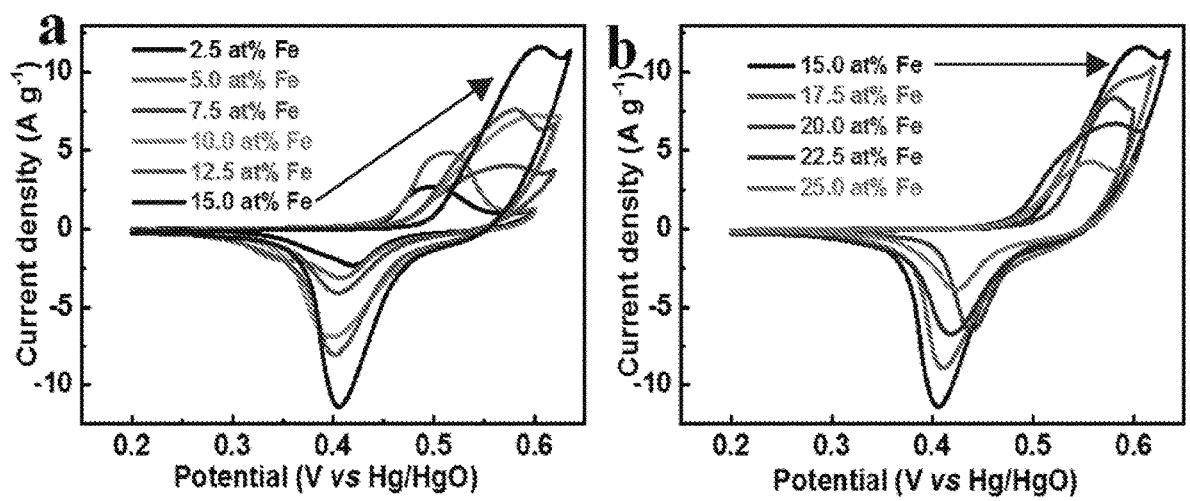
FIGS. 25$a$ and $b$ show CV curves of the NPL with different Fe-contents measured at a scan rate of 50 mV s$^{-1}$ in a three-electrode system, in accordance with an embodiment.
Figure 26:
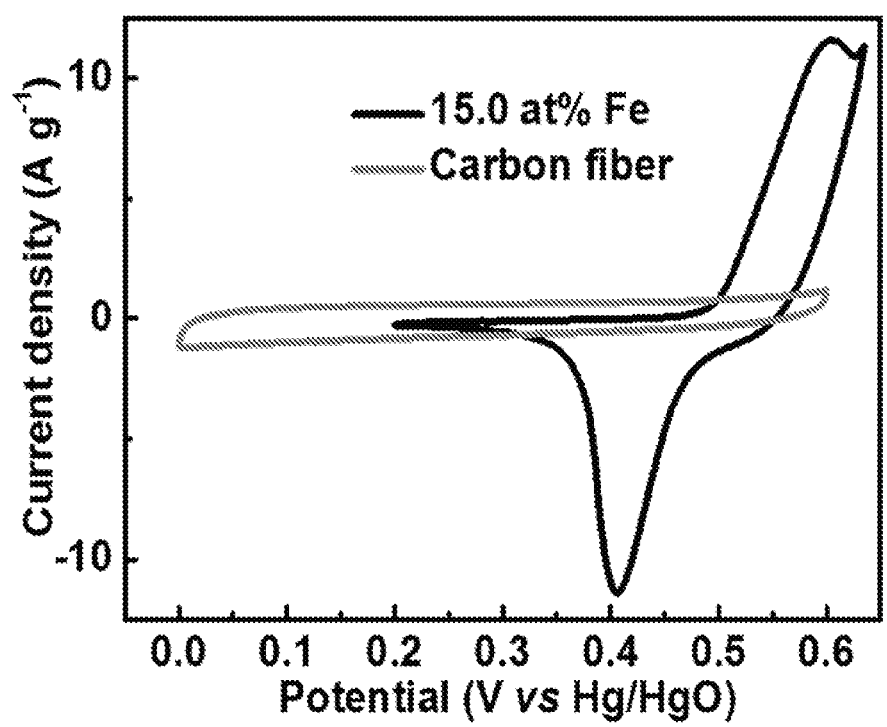
FIG. 26 shows CV curves of the freestanding NiFe oxides thin film and carbon fiber measured at a scan rate of 50 mV s$^{-1}$ in a three-electrode system, in accordance with an embodiment.

FIGS. 25 a and b show CV curves of the NPL with different Fe-contents measured at a scan rate of 50 mV $s^{-1}$ in a three-electrode system. FIG. 26 shows CV curves of the freestanding NiFe oxides thin film and carbon fiber measured at a scan rate of 50 mV $s^{-1}$ in a three-electrode system. In this graph, the NPF was used as the positive electrode and carbon fiber as the negative electrode in a two-electrode configuration.

Figure 27:
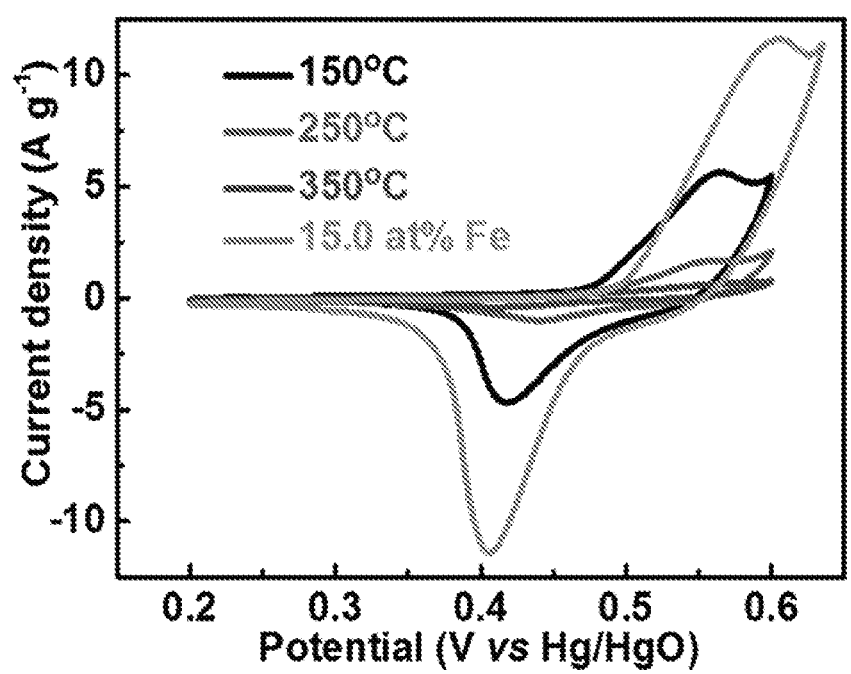
FIG. 27 shows CV curves of the NPL with 15.0 at % Fe thermally treated at different temperatures, in accordance with an embodiment.

The as-prepared NiFe oxides thin films are highly porous and have an amorphous phase that delivered much higher specific capacitance than the annealed samples. FIG. 27 shows CV curves of the NPL with 15.0 at % Fe thermally treated at different temperatures. Because they deliver much higher specific capacitance, this reveals that the NPF of this Example embodiment possesses enhanced electrochemical performance for energy storage (FIG. 27).

Figure 28:
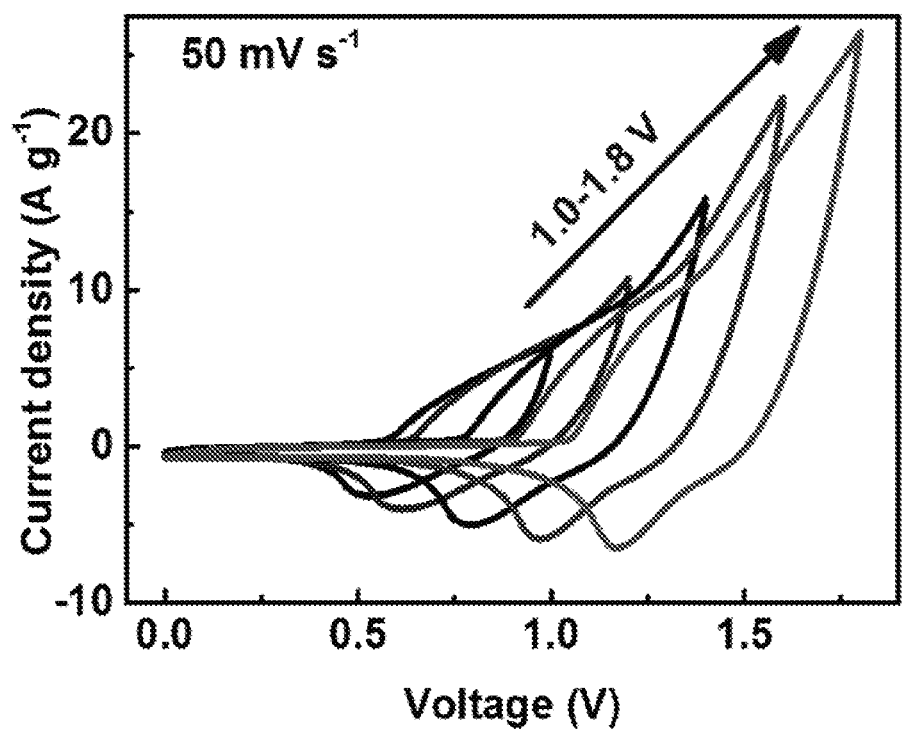
FIG. 28 shows CV curves within different voltage windows measured at a scan rate of 50 mV s$^{-1}$ in a two-electrode punch cell, in accordance with an embodiment.

FIG. 28 shows CV curves within different voltage windows measured at a scan rate of 50 mV $s^{-1}$ in a two-electrode punch cell. In an asymmetric supercapacitor device, the operating voltage window can be enlarged to 1.6-1.8 V. This enables a greatly improved energy density.

Figure 29:
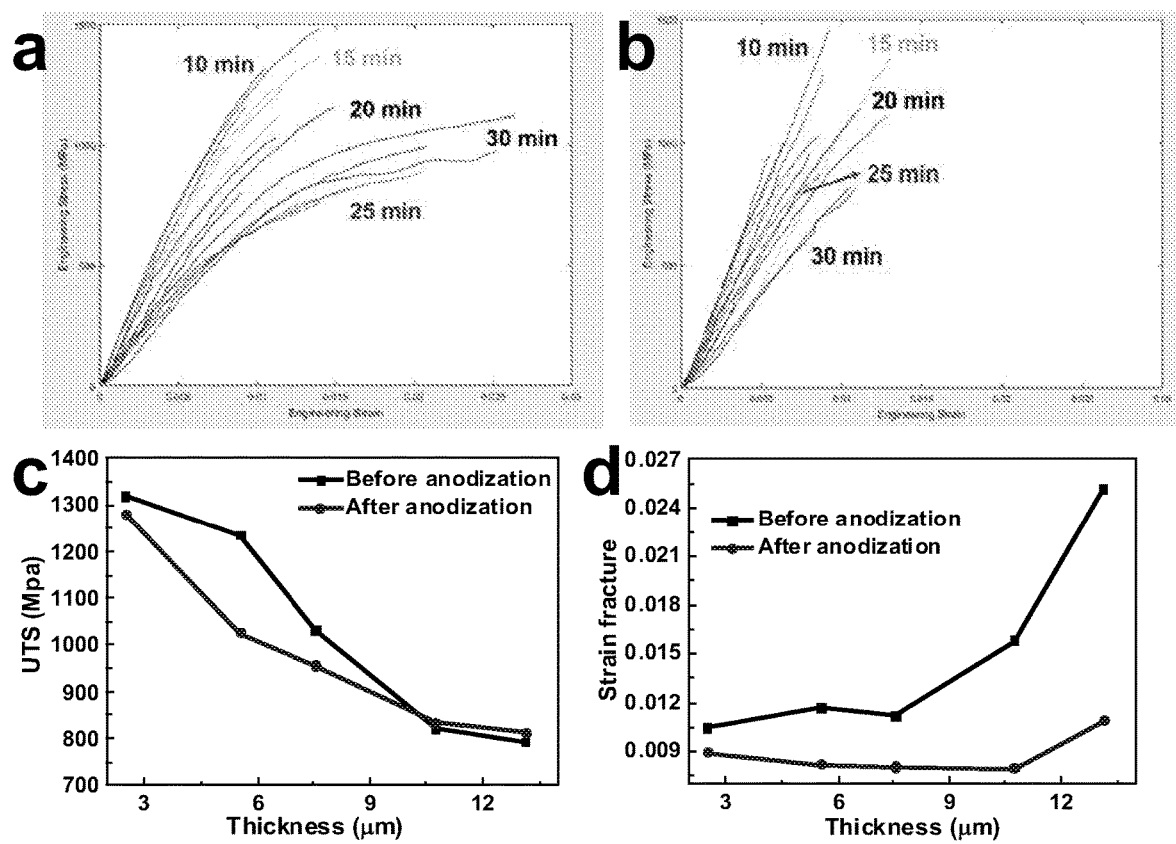
FIG. 29$a$-$b$, show stress-strain curves of NiFe/NiFe NPF before and after anodization, respectively, in accordance with an embodiment.

Lastly, the certain freestanding layers and NPF embodiments created by the processes herein were tested for their mechanical properties. The stress-strain curves of NiFe/NiFe oxides NPF before and after anodization are shown in FIG. 29a-b, respectively. The curves suggest some common features in mechanical properties of thin film materials: high strength and low elongation to failure. Young's modulus, ultimate tensile strength (UTS) and strain at fracture are obtained from the stress-strain curves. Their relations to thickness are shown in FIG. 29c-d. These Figures indicate that the Young's modulus and UTS of thin films increase significantly when the thickness decreases below 10 μm. For example, the average Young's modulus of 13.15 μm thick thin film sample is about 80 GPa. As thickness decreases to 2.55 μm, Young's modulus increases to about 150 GPa. However, the strain at fracture drops from 2.5% (13.15 μm thick) to 1.25% 2.55 μm thick). Analogous to the NiFe thin films before anodization, the mechanical properties of anodized thin films indicate a similar pattern with respect to thickness. The samples before and after anodization have comparable Young's modulus and UTS values, but the NiFe oxides NPF exhibit more brittle-like deformation behavior, characterized by the fact of very low fracture of strain. This result suggests the structure of the freestanding NiFe oxides NPF have a significant effect on the mechanical properties.

Figure 30:
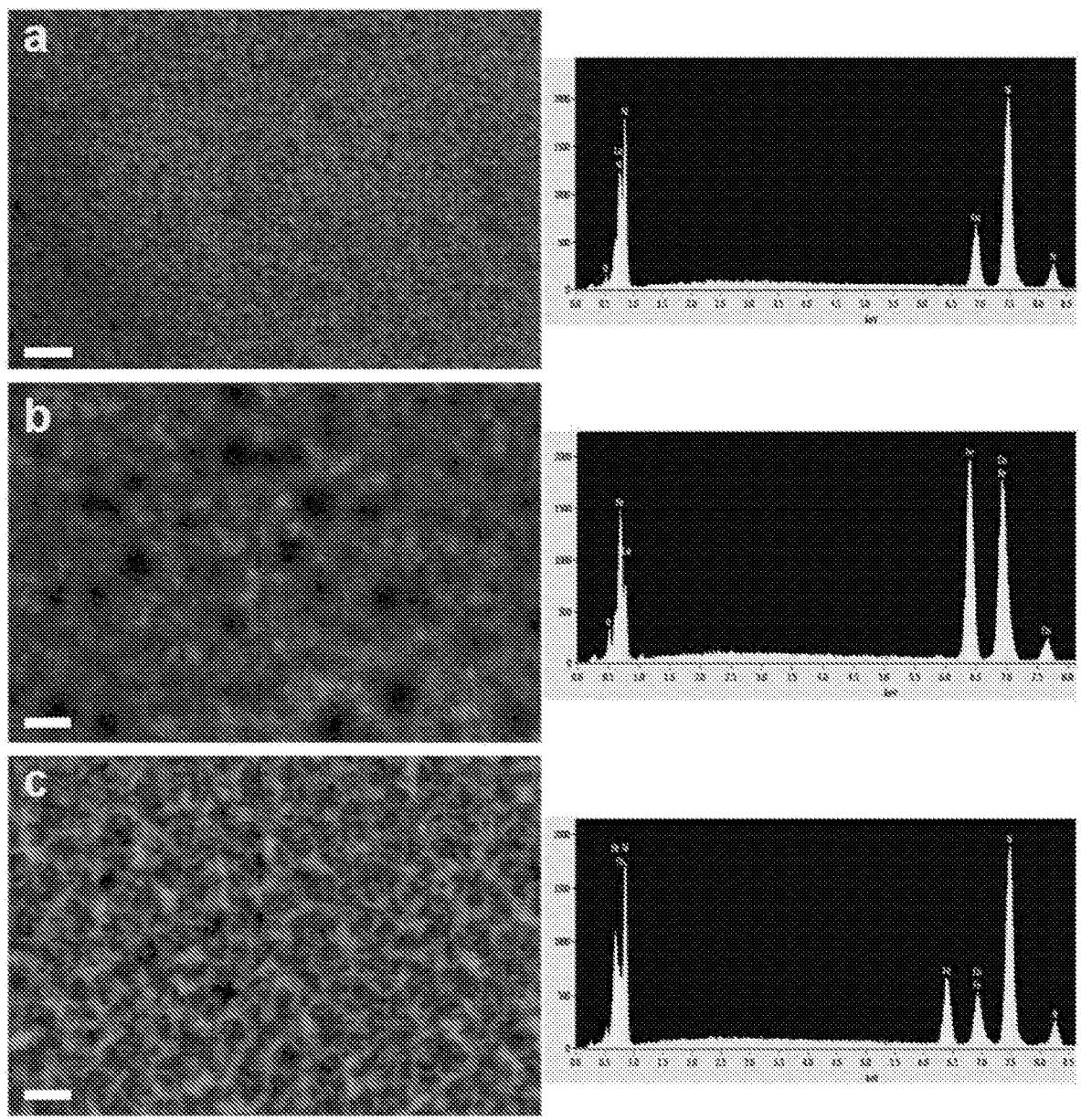
FIG. 30 shows SEM images and energy dispersive spectrometer (EDS) analysis of (a) NiCo oxides, (b) FeCo oxides, (c) NiFeCo oxides thin films fabricated by as-described electrodeposition and anodization treatments.

Similarly, FIG. 30 shows SEM images and energy dispersive spectrometer (EDS) analysis of (a) NiCo oxides, (b)

FeCo oxides, (c) NiFeCo oxides thin films fabricated by as-described electrodeposition and anodization treatments. The scale bars are 200 nm. A uniform nanoporous structure is observed across the material surface for all described alloy combinations, serving as an example to the versatility of this fabrication process. The term "uniform" as it pertains to nanoporosity refers to a number of pores in a given area varying by no more than +/−10% of a different area. This uniformity may be on all or a portion of a surface of any film described herein.

The above description is provided as an aid in examining particular aspects of the invention, and represent only certain embodiments and explanations of embodiments. The examples are in no way meant to be limiting of the invention scope. The materials and methods provided below are those which were used in performing the examples that follow.

It should be borne in mind that all patents, patent applications, patent publications, technical publications, scientific publications, and other references referenced herein are hereby incorporated by reference in this application in order to more fully describe the state of the art to which the present invention pertains.

Reference to particular buffers, media, reagents, conditions and the like, or to some subclass of same, is not intended to be limiting, but should be read to include all such related materials that one of ordinary skill in the art would recognize as being of interest or value in the particular context in which that discussion is presented. For example, it is often possible to substitute one buffer system for another, such that a different but known way is used to achieve the same goals as those to which the use of a suggested method, material or composition is directed.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

We claim:

1. A process comprising at least partially submerging a substrate into an electrochemical deposition bath wherein a composition of the electrochemical deposition bath comprises at least a metal salt and saccharin; forming a deposit on the substrate; removing the deposit from the substrate to form a freestanding layer; and anodizing the freestanding layer to produce a nanoporous film; wherein the composition of the electrochemical deposition bath comprises one of
   (a) $Co^{2+}$ in a range of 0-250 g $L^{-1}$,
      Borate in a range of 0-45 g $L^{-1}$,
      a citrate salt in a range of 0-30 g $L^{-1}$,
      Saccharin up to 2 g $L^{-1}$; wherein the electrochemical bath has a temperature in the range of 15-45° C., and wherein the electrochemical deposition bath comprises a salt of Co in a concentration of at least 0.001 g/L; and
   (b) $Ni^{2+}$ in a range of 0-230 g $L^{-1}$,
      $Fe^{2+}$ in a range of 0-40 g $L^{-1}$,
      Borate in a range of 0-50 g $L^{-1}$,
      the citrate salt in a range of 0-30 g $L^{-1}$,
      Saccharin up to 5 g $L^{-1}$; wherein the electrochemical bath has a temperature in a range of 15-65° C., and wherein the electrochemical deposition bath comprises a salt of Ni and a salt of Fe each in a concentration of at least 0.001 g/L; and
   (c) $Ni^{2+}$ in a range of 0-220 g $L^{-1}$,
      $Co^{2+}$ in a range of 0-155 g $L^{-1}$,
      Borate in a range of 0-40 g $L^{-1}$,
      $Cl^-$ in a range of 0-13 g $L^{-1}$, wherein the electrochemical bath has a temperature in a range of 10-60° C., and wherein the electrochemical deposition bath comprises a salt of Ni and a salt of Co in a concentration of at least 0.001 g/L; and
   (d) $Fe^{2+}$ in a range of 0-100 g $L^{-1}$,
      $Co^{2+}$ in a range of 0-200 g $L^{-1}$,
      $H_3BO_3$ in a range of 0-60 g $L^{-1}$,
      NaCl in a range of 0.001-50 g $L^{-1}$,
      Saccharin in a range of 0.001-5 g $L^{-1}$; wherein the electrochemical bath has a temperature in a range of 10-50° C., and wherein the electrochemical deposition bath comprises a salt of Fe and a salt of Co each in a concentration of at least 0.001 g/L; and
   (e) $Ni^{2+}$ in a range of 0-100 g $L^{-1}$,
      $Fe^{2+}$ in a range of 0-100 g $L^{-1}$,
      $Co^{2+}$ in a range of 0-200 g $L^{-1}$,
      Borate in a range of 0-60 g $L^{-1}$,
      $Cl^-$ in a range of 0-50 g $L^{-1}$,
      Saccharin in a range of 0-5 g $L^{-1}$; wherein the electrochemical bath has a temperature in a range of 10-55° C., and wherein the electrochemical deposition bath comprises a salt of Ni, a salt of Fe and a salt of Co each in a concentration of at least 0.001 g/L.

2. A process according to claim 1, wherein the substrate comprises copper foil, nickel foil, stainless steel, indium tin oxide glass, indium tin oxide coated polyethylene or other conductive substrates.

3. A process according to claim 1, which further comprises conducting an electrochemical deposition process on the substrate, wherein a current is applied having a current density is 0.001-1000 mA $cm^{-2}$.

4. A process according to claim 1, wherein the salt of Fe in electrochemical deposition bath compositions (b), (d) and (e) is an $Fe^{2+}$ salt and the $Fe^{2+}$ is presented in the bath in an amount of at most 20% by weight based on the total weight of discharge ion salts.

5. A process according to claim 1, wherein a source of the Fe comprises $FeSO_4$, $FeCl_2$, $Fe(NO_3)_2$ or other inorganic chemicals containing Fe.

6. The process of claim 1, wherein the anodization is performed using an anodic electrolyte comprising
   $F^-$ in a range of 0.01-11 g $L^{-1}$, and
   water in a range of 0-54 g $L^{-1}$.

7. A process according to claim 6, wherein a solvent for the anodic electrolyte comprises ethylene glycol, glycerol, dimethyl sulphoxide, N,N-dimethylformamide, or isopropyl alcohol, or a combination thereof.

8. A process according to claim 1, wherein the pH of the electrochemical deposition bath is 1-6.

9. A process according to claim 8, wherein a voltage is applied to the electrochemical deposition bath having a constant potential of 5-300 V.

10. The process of claim 1, further comprising treating the film with a chemical vapor deposition (CVD) treatment.

* * * * *